(12) United States Patent
Cao et al.

(10) Patent No.: US 10,979,946 B2
(45) Date of Patent: Apr. 13, 2021

(54) HAND-IN WITH TOPOLOGY HIDING

(71) Applicant: Parallel Wireless, Inc., Nashua, NH (US)

(72) Inventors: Yang Cao, Westford, MA (US); Zeev Lubenski, North Andover, MA (US); Kaitki Agarwal, Westford, MA (US); Prashanth Rao, Wilmington, MA (US); Rahul Atri, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 462 days.

(21) Appl. No.: 16/028,069

(22) Filed: Jul. 5, 2018

(65) Prior Publication Data
US 2018/0332513 A1 Nov. 15, 2018

Related U.S. Application Data

(63) Continuation-in-part of application No. 15/810,003, filed on Nov. 10, 2017, now abandoned.
(Continued)

(51) Int. Cl.
*H04W 36/14* (2009.01)
*H04W 36/00* (2009.01)
(Continued)

(52) U.S. Cl.
CPC .. *H04W 36/00837* (2018.08); *H04W 36/0011* (2013.01); *H04W 36/0055* (2013.01);
(Continued)

(58) Field of Classification Search
CPC ....... H04W 36/00837; H04W 36/0085; H04W 36/0011; H04W 36/0055; H04W 36/14
(Continued)

(56) References Cited

U.S. PATENT DOCUMENTS 9,042,918 B2 5/2015 Teyeb et al.
9,226,204 B2 12/2015 Kuningas
(Continued)

OTHER PUBLICATIONS

Lee Wang, Yongsheng Zhang, Zhenrong Wei, "Mobility Management Schemes at Radio Network Layer for LTE Femtocells," VTC Spring 2009—IEEE 69th Vehicular Technology Conference, Apr. 26-29, 2009, IEEE, Barcelona, Spain.

*Primary Examiner* — Paul H Masur
*Assistant Examiner* — Ellen A Kirillova
(74) *Attorney, Agent, or Firm* — Michael Y. Saji; David W. Rouille

(57) ABSTRACT

Systems and methods for performing handover coordination between base stations are disclosed. In a first embodiment, a method is disclosed, comprising: receiving, at a base station, a first serving cell signal measurement and a first neighbor cell signal measurement from a particular user equipment (UE); sending an adjustment message, from the base station to the UE, containing a cell-specific offset of the serving cell and a cell-specific offset of the neighbor cell in a reporting threshold based on at least one handover adjustment factor received from a coordinating node; receiving, at the base station and subsequent to adjusting the cell-specific offsets, a second serving cell signal measurement and a second neighbor cell signal measurement; and deciding whether to trigger a handover event based on the first and the second serving cell signal measurement and the first and the second neighbor cell signal measurement and the cell-specific offsets.

20 Claims, 14 Drawing Sheets

Related U.S. Application Data

(60) Provisional application No. 62/420,099, filed on Nov. 10, 2016.

(51) Int. Cl.
 *H04W 88/16* (2009.01)
 *H04W 84/04* (2009.01)

(52) U.S. Cl.
 CPC ....... *H04W 36/0085* (2018.08); *H04W 36/14* (2013.01); *H04W 36/0058* (2018.08); *H04W 84/045* (2013.01); *H04W 88/16* (2013.01)

(58) Field of Classification Search
 USPC ........................................................ 370/331
 See application file for complete search history.

(56) References Cited

U.S. PATENT DOCUMENTS

| | | |
|---|---|---|
| 9,253,704 B1 | 2/2016 | Sarkar et al. |
| 2008/0311927 A1 | 12/2008 | Boman et al. |
| 2010/0311407 A1 | 12/2010 | Yao et al. |
| 2010/0317351 A1 | 12/2010 | Gerstenberger et al. |
| 2011/0053591 A1 | 3/2011 | Kubo et al. |
| 2012/0220290 A1 | 8/2012 | Awad |
| 2012/0269062 A1 | 10/2012 | Cho |
| 2012/0315956 A1 | 12/2012 | Mochida et al. |
| 2013/0028081 A1 | 1/2013 | Yang et al. |
| 2013/0077482 A1 | 3/2013 | Krishna et al. |
| 2013/0083744 A1 | 4/2013 | Peng et al. |
| 2013/0143563 A1 | 6/2013 | Singh et al. |
| 2013/0188499 A1 | 7/2013 | Mach et al. |
| 2013/0272274 A1 | 10/2013 | Ishida et al. |
| 2014/0106790 A1 | 4/2014 | Kakinada et al. |
| 2014/0226513 A1 | 8/2014 | Hapsari et al. |
| 2014/0233386 A1 | 8/2014 | Jamadagni et al. |
| 2014/0308959 A1 | 10/2014 | De Benedittis et al. |
| 2015/0056995 A1 | 2/2015 | Baillargeon |
| 2015/0207700 A1 | 7/2015 | Elmdahl et al. |
| 2015/0282010 A1 | 10/2015 | Yang et al. |
| 2015/0358956 A1 | 12/2015 | Choi et al. |
| 2016/0029253 A1* | 1/2016 | Sarkar ............ H04W 36/00835 455/436 |
| 2016/0073312 A1 | 3/2016 | Sridhar |
| 2016/0119941 A1 | 4/2016 | Ko et al. |
| 2016/0227449 A1 | 8/2016 | Sivavakeesar et al. |
| 2016/0277991 A1 | 9/2016 | Yang et al. |
| 2016/0309360 A1* | 10/2016 | Noldus ............ H04W 28/0289 |
| 2017/0055238 A1 | 2/2017 | Grayson et al. |
| 2018/0027460 A1 | 1/2018 | Zhang |

* cited by examiner

HAND-IN WITH TOPOLOGY HIDING

CROSS-REFERENCE TO RELATED APPLICATIONS

This application is a continuation-in-part of, and claims priority under 35 U.S.C. § 120 to, U.S. patent application Ser. No. 15/810,003, entitled "Hand-In With Topology Hiding" and filed Nov. 10, 2017, which itself is a non-provisional conversion of, and claims priority under 35 U.S.C. § 119(e) to, U.S. Provisional App. No. 62/420,099, filed Nov. 10, 2016, each of which is also hereby incorporated by reference in its entirety. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, respectively. This application also hereby incorporates by reference in their entirety each of the following U.S. Pat. applications or Pat. App. Publications: US20150098387A1; US20170055186A1; US20170273134A1; US20170272330A1; and Ser. No. 15/713,584.

BACKGROUND

Small cell base stations are base stations that have less transmit power and range than a macro base station, which typically provides approximately 40 watts of transmit power or more. Small cells are typically part of a heterogeneous network (HetNet). It is understood that the embodiments described below pertain to Long Term Evolution (LTE) networks and technologies, but not to the exclusion of 3G, UMTS and/or other networks and technologies.

SUMMARY

Systems and methods for performing handover coordination between base stations are disclosed. In a first embodiment, a method is disclosed, comprising: receiving, at a base station, a first serving cell signal measurement and a first neighbor cell signal measurement from a particular user equipment (UE); sending an adjustment message, from the base station to the UE, containing a cell-specific offset of the serving cell and a cell-specific offset of the neighbor cell in a reporting threshold based on at least one handover adjustment factor received from a coordinating node; receiving, at the base station and subsequent to adjusting the cell-specific offsets, a second serving cell signal measurement and a second neighbor cell signal measurement; and deciding whether to trigger a handover event based on the first and the second serving cell signal measurement and the first and the second neighbor cell signal measurement and the cell-specific offsets.

The method may further comprise receiving the second serving cell signal measurement and the second neighbor cell signal measurement from the particular user equipment, and, handing over the particular user equipment to a neighboring base station. The base station may be a small cell, and the method may further comprise coordinating with a macro cell. The handover adjustment factor may be calculated based on a prior user equipment handover. The coordinating node may be a macro cell. The coordinating node may be a gateway situated between the small cell and a cellular operator core network node.

The method may further comprise receiving the at least one handover adjustment factor as a value from a coordinating node. The method may further comprise using cached measurement report data and not requesting updated measurement reports from user equipments.

The base station may be a macro cell, and the cell-specific offsets may be adjusted to decrease handovers away from the macro cell, thereby causing user equipments to tend to remain attached to the macro cell instead of being handed over to a small cell and being handed back to the macro cell. The base station may be a macro cell, and the cell-specific offsets may be adjusted to increase handovers away from the macro cell and toward the small cell. The base station may be a small cell, and the cell-specific offsets may be adjusted to decrease handovers away from the small cell and toward the macro cell. The base station may be a small cell, and the cell-specific offsets may be adjusted to increase handovers away from the small cell and toward the macro cell.

The method may further comprise adjusting the cell-specific offset of the serving cell and the cell-specific offset of the neighbor cell subsequent to a prior handover and based on the at least one handover adjustment factor. The method may further comprise adjusting the cell-specific offset of the serving cell and the cell-specific offset of the neighbor cell on a per-UE basis based on a velocity of the particular UE.

The handover adjustment factors may further comprise an overload condition of a macro overlay layer, overload condition of one or more small cells, location of the particular UE, and type of data usage by the particular UE. The handover adjustment factors may further comprise available modulations and in-use modulations at the serving cell and the neighbor cell, and available power levels at the serving cell and the neighbor cell, and the handover adjustment factors may further comprise inter-layer adjustment factors. The handover adjustment factors may further comprise load and scheduling status of frequencies at the serving cell and at the neighbor cell. The handover adjustment factors may further comprise inter-radio access technology (inter-RAT) handover adjustment factors, for handing over from LTE to 3G or to another RAT.

The method may further comprise reporting of load and topology to the coordinating node. The method may further comprise reporting of load and topology within a cluster of small cells to each small cell in the cluster, and from at least one cell in the cluster to the coordinating node. The coordinating node may be the macro cell. Load may be calculated based on one or more of user count, data throughput, processor load, memory load, and radio resource utilization.

The method may further comprise using an X2 overload indicator to communicate load. The method may further comprise performing coordination between macro and small cells for sharing topology information and load distribution information between the macro and small cells. The method may further comprise centralizing radio resource management (RRM) functionality at a macro cell layer to coordinate inter-layer mobility and determine a target cell for handover using UE measurement reports.

DETAILED DESCRIPTION

Figure 1:
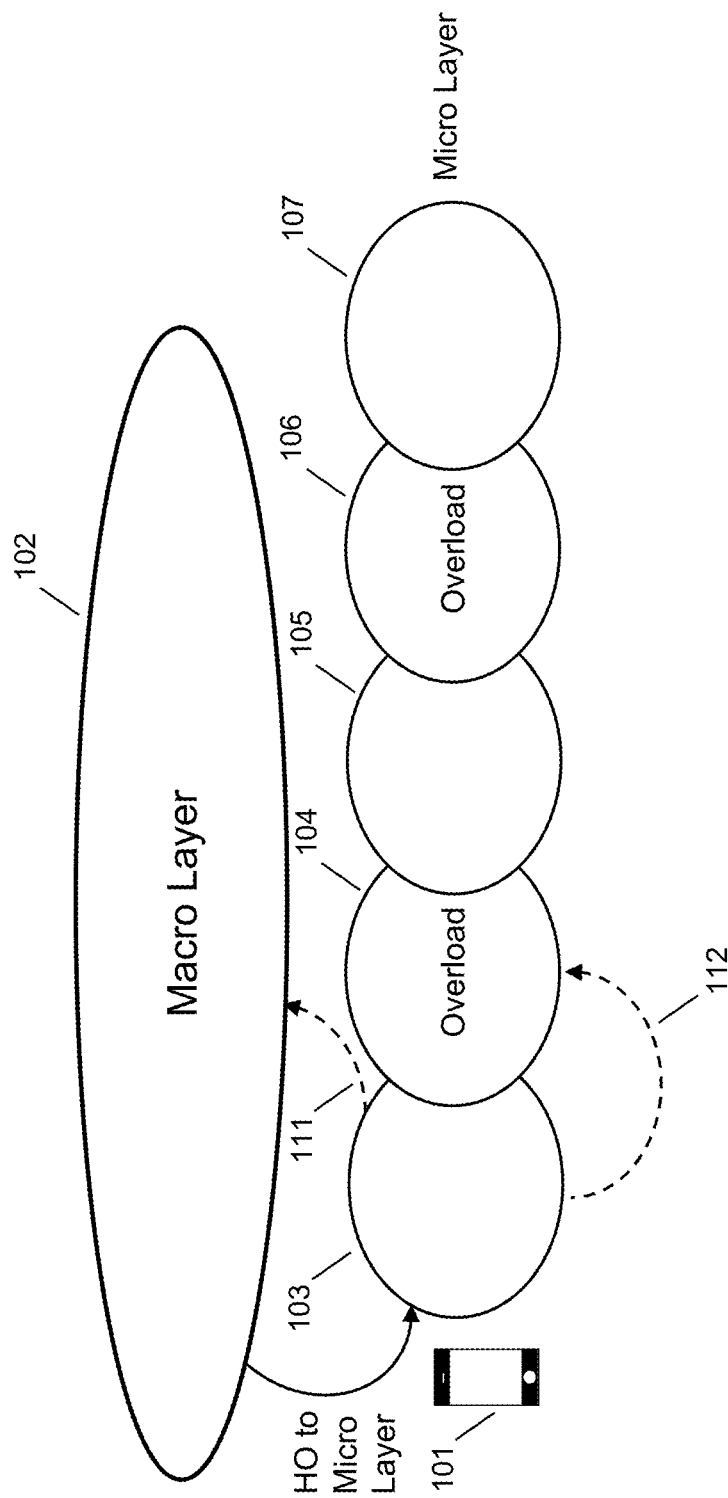
FIG. 1 is a schematic diagram showing a macro and small cell deployment scenario with handover, in accordance with some embodiments.

Small cells may be deployed in conjunction with macro cells. Such a deployment may be referred to as a multi-layer deployment, with the macro cell understood to be laid over the micro cell. Various deployment scenarios exist, as shown in the attached FIG. 1. For example, multiple small cells may be overlapping within the coverage area of a single macro (overlapping underlay), or multiple small cells may not be overlapping within the coverage area of a single macro (non-overlapping underlay), or multiple non-overlapping macros may be deployed in conjunction with overlapping micro cells (coverage augmentation with overlapping underlay), or multiple overlapping macros may be deployed in conjunction with overlapping micro cells (overlapping overlay with overlapping underlay). Other deployment scenarios exist. It is understood that the systems and methods described herein may be for one deployment, or for more than one deployment, or may be extended to work with more than one deployment.

In a first embodiment, a small cell and/or a core network are enabled to have a policy for user equipments (UEs) camping on base stations, otherwise known as a camping policy. Camping may involve cell selection or re-selection, and may involve idle mobility or connected mobility (for handovers and redirections). Management of mobility may be based on one or more of: network overload conditions/thresholds; current/typical traffic patterns or services used of the UE; UE speed, location, or movement pattern; UE measurements; and UE capability and access restrictions.

In some cases, the UE shall be caused to remain camped on the macro cell instead of handing over to a micro cell or small cell. For example, this may be useful in a macro coverage/small cell underlay situation. This has the advantages that a number of handovers will be reduced, as the macro has greater footprint area, better signal quality, and handovers shall only occur in cases that the micro or small cell has better coverage and quality (SINR). However, the disadvantages include the difficulty of cell ID reuse, and the difficulty of causing a UE to hand over to a micro or small cell with potentially worse signal. As well, this may not provide good coverage if the UE is moving quickly.

In some cases, the UE shall be caused to camp on the micro or small cell, which lacks the disadvantages of the prior approach, but will involve a higher number of potential overload conditions and hence a higher number of handovers.

Why Camping strategy is important: Handovers in connected mode shall be avoided as much as possible; Potential call/session drop; Increases signaling and data traffic due to the big number of small cells; and Increase backhaul usage. Camping allows to predict and minimize potential layer overload conditions. At least two clear camping strategies exist: Camping on Micro and Camping on Macro.

Camping on Macro: Pros—Minimized number of handovers (once UE in connected mode) Handovers performed only in case of the potential overload conditions Handovers performed based on the measurements in case of the coverage problems Cons—In case of handover, handover will be performed from Macro to Micro Potential problem with Cell Ids. Due to the big number of the small cells sell id will be reused and this would require "non" standard handover method (see handover section) Normal handover measurement mechanisms will not work as Macro may have stronger signal. Would require some "non" standard handover method (see handover section) UE speed shall be taken into account.

Camping on Micro: Cons—High number of handovers (once UE in connected mode) Potential Overload Conditions will be reached fast and hence number of handovers will be high Pros—Standard handover mechanism. Measurement based handover is not required—blind handover potentially will have very high success rate No UE speed shall be taken into account.

In some cases camping shall be assigned based on the following strategies, as shown in Table 1, below.

TABLE 1

| Overload Of Macro | Overload of Micro | UE Speed | Camp on Macro | Camp on Micro |
|---|---|---|---|---|
| X | | High Mobility | X | |
| X | | Medium Mobility | X | |
| X | | Low Mobility | | X |
| | X | High Mobility | X | |
| | X | Medium Mobility | X | |
| | X | Low Mobility | X | |

In cases of network overload, once UE in idle mode gets close to a small cell and can receive SIB messages, the UE may be forced to select a small cell using measurements (thresholds sent with SIB1) and cell reselection (using priority information provided in SIB3). If the small cell becomes overloaded subsequently, an SIB1 with a Cell Barred indication may be sent.

Regarding UE speed, if a UE is moving at a speed higher than a threshold X, which may be calculated based on coverage areas, it may be prohibited from selecting or reselecting micro cells. A reselection time T{reselection} may be set that may be combined with the High, Medium, and Low mobility factors defined in 3GPP TS 36.304. T{reselection} may be long enough for a UE to not be able to select the small cell when the UE transits the small cell at high speed. The parameter may be sent to the UE using an SIB3 message. Under normal conditions high speed and medium speed users shall not enter any small cell in a small cell layer, but in a configuration where coverage augmentation with overlapping underlay is provided, small cell selection may be required. In such cases the small cells may have knowledge of their macro neighbor coverage. Measurement reports from the UEs camping on each small cell can be used to estimate macro Coverage and overlapping zone. As an alternative, exchange of such information may be enabled using proprietary extensions over the X2 protocol.

UE speed policy for camping. In some embodiments, UE moving with the speed>X (X shall be automatically calculated based on the small cell coverage radios) shall not select or reselect Micro Cells. 3GPP TS 36.304 defines High, Medium and Low Mobility states. 3GPP TS 36.331 defines TreselectionEUTRA parameter which shall be combined with the High, Medium and Low mobility factor. TreselectionEUTRA shall be long enough for the UE moving with the high speed, passing through the Micro Cell coverage not be able to select the Micro Cell. This parameter is transmitted with SIB3 message. Under normal conditions high speed and medium speed users shall not enter the Micro Layer, but in configuration "Coverage augmentation with overlapping underlay" presented on slide one Micro Selection may be required. To have fully automated Camping policy based on Speed, Micro eNodeBs shall have a knowledge of the Macro neighbor coverage. Measurement report from the UEs camping on Micro can be used to estimate the Macro Coverage. As alternative exchange of the proprietary extensions over the X2 shall be implemented.

In a second embodiment, a handover policy appropriate for small cells is described. Connected mobility may require coordination between the macro and micro layers, based on various factors. For example, factors such as overload conditions of macro and micro layers, the location of a UE to be used for hand-ins, the type of application and/or data being used may be assessed in the course of providing connected mobility. More specifically, when a neighbor cell becomes better than a serving cell, as determined on the basis of RSRQ/RSRP, a time delay may be in place around the time at which the trend is identified and the time at which the trigger is activated to cause the handover. The time delay may be biased based on various factors, such as layer overload conditions, UE speed, type of data being transferred, and/or other factors, and the Ocn, Ocs, and hysteresis parameters may be made changeable to allow this time delay to be changed dynamically. More specifically, a micro cell may detect an internal overload, may send an RRCConnectionReconfiguration request to the UE to hand the UE over to the macro cell, and in the same message cause the Ocn, Ocs, and/or hysteresis parameters to be changed on the UE. The same overload-driven dynamic parameter-biased handover could take place between a macro cell and a micro cell.

In some embodiments, a macro layer may have an algorithm that performs a look-ahead handover. Specifically, the macro may perform a handover based on topology and load distribution knowledge of the micro layer. In some embodiments the macro may cause a handover using these criteria and/or processing performed at a cloud coordination server. The cloud coordination server may be located between the collection of micro cells and the macro layer, in some embodiments. The cloud coordination server may interact with both the macro and the micro layers to leverage SON, MRO, ANR, and ICIC features in both macro and micro layers. The coordination server may coordinate inter-layer mobility.

In some embodiments, a trigger may be used. A small cell base station, Cell A, may have a region within a first region centered around the center of Cell A, within which its transmit signal is received at −90 dBm. A trigger A2 may be set at −90 dBm, demarcating a first trigger region. If a UE reports poor coverage but is within this trigger region, transmit power can be increased to make a UE stay within the cell. Alternately, this trigger A2/A4 may be used for load sharing, such that when UEs are predicted to have bad coverage and greater than threshold coverage from neighbor, UEs that are within this trigger region can be offloaded forcefully to neighbor cells.

A second trigger region may be set at −100 to −108 dBm, trigger A3, to enable normal handover based on UE speed and clutter. A third trigger region may be set at −110 dBm, drag further, when the target is already, we can keep UEs on their source cells for a longer time to delay handover and the resultant increased load on the target cell. Trigger release may also be performed with re-direct to the second best RF/IRAT/Inter Frequency neighbor in case of highly loaded primary neighbor neighbors or dragging for Ping-Pong oscillating UEs.

In some embodiments, potential PCI confusion is alleviated. Due to the typical cell size of Micro eNodeBs being much smaller than macro cells, there can be multiple eNodeBs within the coverage of the Macro eNodeB that have the same PCI. This may lead to PCI confusion, wherein the source eNodeB is unable to determine the correct target cell for handover from the PCI included in the measurement reports from the UE. In some cases, a measurement report may be requested from the UE to clarify the PCI, by, for example, causing the UE to report an ECGI.

For an UE located away from or not camped on micro cells, there is no need to perform measurements and no need to receive SIB messages. In the case that the micro network is overloaded, there is no need for the UE to perform measurements or acquire system information of the micro cells. In the case that multiple destination micro eNodeBs may have more or less the same signal quality, the handover decision may be made based on overload conditions and additional matrix (for example number of number of UEs with specific data traffic).

In some embodiments, a smart handover algorithm may be provided that determines whether handover should be performed based either on (1) load or (2) coverage trigger. For load-based handover, the handover source cell may assess what cell has better resources, may distinguish based on type of traffic/application, and may incorporate historical peak hour patterns into a determination of which cell the handover should target. Different parameter profiles may be created for different traffic patterns, and the profiles may be tuned. For example, a profile for a cell covering a highway should be tuned to cause users to be handed over immediately, to cause A3 to be less so that the trigger will trigger more quickly, reducing hysteresis and offset, reducing number of minimum reports, reducing time to trigger, etc.

A distance and/or a location of the UE may be deduced from timing advances and SRS. The location of the UE may also be determined by adjusting transmit power, identifying which UEs are near the cell edge, and providing that information back to a SON module to further adjust coverage and/or transmit power. Dynamic transmit power may also be used to offload traffic by changing cell footprint. Idle users may also be offloaded forcibly to less-loaded cells by changing offsets.

For coverage-triggered handovers, in addition to the radio frequency environment (e.g., clutter) and UE speed, one significant problem is ping-pong, or oscillating, handovers. This problem occurs when a UE is handed over back and forth between the same two cells. When performing a handover, to reduce ping-pong situations, the target base station may consider the last handover time and the last served PCI for the incoming UE, and if the handover from the same PCI was less than a given number of seconds prior (e.g., 2 seconds), and/or a number of handovers from the same PCI has exceeded a threshold, the target base station may change the cell individual offset parameter, delay handover reporting, may delay execution of handover for this UE by a given number of milliseconds, or perform other steps to reduce the likelihood that the handover will successfully complete.

In a third embodiment, a method for allocating physical cell identifiers (PCIs) is described. A centralized entity or coordinating node, which may be a Parallel Wireless LTE access controller (LAC), may prepare an active set of neighbor sites. The active set may have all neighboring PCIs, including indoor, macro, neighbor of macro, small cell base stations, including those under and not under the management of the centralized entity, CSGs, etc. Based on the active set, PCIs may be allocated, either at the centralized entity or elsewhere. In some embodiments, the active set may include, or allocation of PCIs may incorporate, multiple inputs, such as GPS coordinates, neighbor lists of some or all transmitters around a base station, UE measurements, handover statistics (weighting, rate of success, etc.), and overshooting cells or cells that may be visible to more than one small cell/base station. Overshooting cells, also called boomer cells, may cause PCI allocation confusion as they are visible from more than one base station. Timing advance commands and GPS coordinates may be used to perform PCI allocation to avoid the re-use of a PCI used by a boomer cell.

As another example of the third embodiment, given a dense environment in which only a small number of PCIs are available for allocation, and a single frequency band of 2.3 GHz is intended for use for a dense heterogeneous network of 5×5 kilometers square, supporting several thousand small cells, some indoor and some outdoor, with interference among the cells, the PCI allocation environment is complex. To help allocate PCIs effectively, clusters may be identified based on handover patterns (weightage/attempts), UE measurements such as indoor leakage, distance from the small cells to the macro cell (or from each other), GPS coordinates, closed subscriber group, X2 neighbor communications, and outdoor/indoor characteristics. Each cluster may be assigned individual PCIs and neighbor lists, which can be an active set or a cluster's neighbor list. All cells in a configurable radius may have all the PCIs as dummy neighbors, to ensure that the same PCI is not allocated. For cells further away than distance D, or (number of allocable PCIs) mod 3÷6÷30, whichever is greater, PCI duplication may occur. In some embodiments, boomer cells may be identified by timing advance counters and/or excluded.

In a fourth embodiment, systems and methods for a sniffing mode base station are described. In some embodiments, a base station may remain in a sleep mode instead of a broadcasting mode. When a given number of UEs approach the small cell base station (HO/MOS), the base station may become active. When the macro cell or when a neighboring base station becomes loaded, the base station may also become active. Transmit power may also be adjusted such that the base station's transmit power is low instead of or during sleep mode.

In a fifth embodiment, systems and methods for small cell discovery are described. If small cells is under overlay of a macro cell, due to signal imbalance, even if radio conditions are good for connecting to the small cell, due to the macro cell the SINR is degraded. To solve this issue, higher search thresholds may be configured for the macro cell, specifically, QRexmin level, to cause a UE to remain with the small cell even if the UE also has macro coverage.

In a sixth embodiment, systems and methods for paging load optimization are described. In some embodiments, it may not be a good idea for a small cell to handle paging when overlaid by a macro due to its lesser processing power, capabilities and backhaul capacity. In order to limit the paging area of a small cell to a geographical area covered by one macro cell, all small cells can use the cell identity of their strongest neighboring macro cell to decide on their initial paging area code. Idle UEs may be offloaded to macro cells by adjusting reselection parameters. Configuration of tracking area codes of small cells to be the same as tracking area codes of neighboring cells to avoid multiple tracking area updates (TAUs) may also be performed.

In a seventh embodiment, systems and methods for a dynamic neighbor list based on search zones suitable for a mobile vehicle are described. One-way neighbor addition may also be enabled. In some embodiments, a base station, such as an eNodeB, may be fitted in a moving bus. As the bus moves along the route, it moves closer to and further from other base stations, which may be macro base stations. To provide service to users on the bus. Reference transmit power may be dynamically controlled so that cell area is confined to the bus only and does not include area outside the bus, so as not to cause service disruptions for users outside the bus, such as people standing outside the bus or people within another nearby bus located at a bus depot.

As the bus moves, the base station may be configured with a neighbor table at geographic intervals of approximately 100 to 300 meters, or another distance, as appropriate. The bus location and distance may be determined by GPS or another means. The neighbor table may be created on the bus or at a centralized node, such as in a self-organizing network (SON) module, in some embodiments. The base station installed in the bus may report neighbor cells, their PCIs, neighbor cells' RSRPs reported by UEs, and neighbor cells' RSRQs reported by UEs, and may report this information to a centralized node, in some embodiments.

In some embodiments, LTE UEs may be solicited to collect, or may be passively subject to collection from, serving cell RSRP, and/or tracking area, pathless, cell center and cell edge status. In some embodiments, LTE UEs may also be subject to collection of information regarding handovers, including information about the location of handovers, and PCIs of handover target cells.

In some embodiments, the SON module in the centralized node may maintain a history of several days' worth, such that SON will attempt to determine the appropriate PCI given any PCI request situation, including PCI conflict or PCI confusion situations. The SON may continue to refine its results based on GPS measurements. UE GPS measurements and/or base station GPS measurements may also be tracked by the SON module, in some embodiments. The method thus described could be used as appropriate on any other type of moving vehicle, such as a car, plane, boat, train, airship, balloon, or other conveyance.

In an eighth embodiment, automatic neighbor relations methods and procedures are described. One or more of Retainability issues, high drop rate, and handover failure may be used as triggers. A method may be performed that involves: storing a current neighbor list for reverting at a later time; scanning a neighbor list; adding potential neighbors; scanning neighbors at a particular distance, the search ring radius for Omni antennas and search sector area for directional antenna can be function of number of inputs: can be user defined or based on an RF planning propagation model (via manual or RF tools) or input can be farthest neighbor distance (with Handover success rate greater than threshold e.g. 95%) added to user defined, clutter based search criteria (additional distance), removing overshooting neighbors and, in some embodiments, blacklisting them for the next 24 hours or another configurable time period; removing neighbors with less than Y % handover success rate and, in some embodiments, blacklisting them for the next 24 hours or another configurable time period; creating a neighbor table using the remaining neighbors. If one or more measured key performance indicators does not improve, the configuration may be reverted to the prior neighbor list.

In a ninth embodiment, the use of various key performance indicators (KPIs) is described for improvement of performance of a network. KPIs are obtained, and stored over time. The KPIs may be stored over a configurable period of time, which may be 24 hours. A user or machine process may look back into the KPIs for trends. Once trends are identified, the parameters may be adjusted and changes may be made in the network. The changes may be requested, in some embodiments, with an acceptance step provided subsequently, in some embodiments. The changes may be performed for a subset of the network, in some embodiments. If the changes are identified to provide improved performance, the changes may be accepted. If the changes are identified to degrade performance, the changes may be reverted and/or rejected, and/or the initial configuration may be restored. In some embodiments, restoration to an initial configuration may be performed automatically after a time period for certain applications, such as congestion control and load sharing, and/or other applications which change over time but are desired to be reset.

Systems and methods are disclosed for providing enhanced performance for networks incorporating "small cell" base stations. Small cell base stations are base stations that have less transmit power and range than a macro base station, which typically provides approximately 40 watts of transmit power or more. Small cells are typically part of a heterogeneous network (HetNet). It is understood that the embodiments described below pertain to Long Term Evolution (LTE) networks and technologies, but not to the exclusion of 3G, UMTS and/or other networks and technologies.

Small cells may be deployed in conjunction with macro cells. Such a deployment may be referred to as a multi-layer deployment, with the macro cell understood to be laid over the micro cell. Various deployment scenarios exist, as shown in the attached FIG. 1. For example, multiple small cells may be overlapping within the coverage area of a single macro (overlapping underlay), or multiple small cells may not be overlapping within the coverage area of a single macro (non-overlapping underlay), or multiple non-overlapping macros may be deployed in conjunction with overlapping micro cells (coverage augmentation with overlapping underlay), or multiple overlapping macros may be deployed in conjunction with overlapping micro cells (overlapping overlay with overlapping underlay). Other deployment scenarios exist. It is understood that the systems and methods described herein may be for one deployment, or for more than one deployment, or may be extended to work with more than one deployment.

In some embodiments, due to the typical cell size of Micro eNodeBs being much smaller than macro cells, there can be multiple eNodeBs within the coverage of the Macro eNodeB that have the same PCI. This may lead to PCI confusion, wherein the source eNodeB is unable to determine the correct target cell for handover from the PCI included in the measurement reports from the UE. In some cases, a measurement report may be requested from the UE to clarify the PCI, by, for example, causing the UE to report an ECGI.

In some embodiments, when a PCI conflict is detected, a handover request may be forked. Specifically, the handover request may be sent from the source cell to all cells known to the source cell that have that PCI. Two or more handover requests, then, may be created. However, only one handover request will ultimately be met/satisfied, because the receiving cell will determine either that the cell does contain the UE identified in the request and return a handover acknowledgement message, or that the cell does not contain the UE identified in the request and will fail and/or not return a handover acknowledgement message. The handover request may be sent either via X2 or S1, in some embodiments.

The challenges include extensive coordination between macro and micro layers. Coordination could be using X2 messages or other messages, in some embodiments. The coordination could involve handover adjustment factors, such as: overload conditions of cells; location, position, velocity, direction of a UE (especially important for handling hand-ins to the micro cell layer); type of data and application usage; and other factors. Scheduler data could also be exchanged, and ideally knowledge and interlayer influence could be exerted on the adopted modulation and power control parameters.

A "Look ahead handover" method is disclosed, which may be situated at a macro cell layer. This method could use one or more of the following information: partial or full topology and load distribution knowledge of the Micro Layer by Macro; partial or full Micro Layer topology and load distribution of the Micro Layer by each Micro in a Micro Cluster, etc. In some cases, Micro/Macro RRM could be centralized (or at least the subset of the RRM functionality) in order to be able to coordinate inter layer mobility, either at the macro or at another location. The macro and micro layers could interact with SON, MRO, ANR, ICIC communications, and with the "Look ahead handover" algorithm as well, as follows.

Handover from Macro Layer to Micro Layer is different from normal handover procedure in two aspects: Firstly, potential PCI confusion. Due to the typical cell size of Micro eNodeBs being much smaller than macro cells, there can be multiple eNodeBs within the coverage of the Macro eNodeB that have the same PCI. This may lead to PCI confusion, wherein the source eNodeB is unable to determine the correct target cell for handover from the PCI included in the measurement reports from the UE. Secondly, battery life of UEs is a concern. Measurements performed by UE drain the battery. For UE been away from the Micro Cells, there is no need to perform measurements and no need to receive SIB messages. In case of the Micro network overloaded, there is no need for UE to perform measurements or acquire system information of the Micro Cell eNodeBs. Multiple Destination Micro eNodeBs may more or less same signal quality. The handover decision shall be made based on the overload conditions and additional matrix (for example number of number of UE with specific data traffic, etc.).

In a smart handover, the handover selection algorithm could be activated or triggered based on load.

Issues could include: a need to choose the cell with better resources. The algorithm could distinguish between types of traffic, application, peak hour patterns. The solution may be one or more of the following: creating Different parameters profiles for different traffic patterns; optimizing parameters such that Handover is smooth, or dynamically changing TX power to offload traffic by changing cell foot print. Idle users can be forcefully offloaded to less loaded cells by changing offsets.

The handover selection algorithm could also be activated by coverage information. Issues that could arise include Ping Pongs (Oscillations), frequent HOs, Clutter type Highway etc., UE speeds. The solutions could be as described hereinbelow. Alternately, one more possibility could be A2 prior to A3 reporting.

FIG. 1 is a schematic diagram showing a macro and small cell deployment scenario with handover, in accordance with some embodiments. User equipment (UE) 101 is passing through a region where there are many base stations providing wireless access, perhaps using a Long Term Evolution (LTE) radio access technology (RAT). A macro base station provides umbrella coverage to a large geographic area, shown here as macro layer 102. Small cells 103, 104, 105, 106, 107 each provide coverage over a smaller geographic area. Small cells 104, 106 are overloaded. In operation, UE 101 would ideally remain within cellular coverage; in order to do so it could remain attached to macro 102, or it could be handed over from macro 102 to small cell 103, and then to small cell 104 and so on in sequence. However, as shown, since small cell 104 is overloaded, UE 101 cannot effectively be handed over from small cell 103 to small cell 104, shown as handover path 112, and typically the UE would be handed over back to macro 102, shown as handover path 111.

However, in accordance with some embodiments of the present disclosure, it is possible to adjust handover characteristics of one or more base stations in the path of the UE to effective provide "look ahead handover," that is, using information about potential future handovers to improve handover characteristics. In the present exemplary scenario, UE 101 should not be handed over from macro layer 102 to small cell 103 at all. This is accomplished as follows.

In operation, macro base station 102, which is the serving base station, is made aware of the likelihood that UE 101 will soon be handed over to small cell 103, in some cases using the direction and velocity of UE 101. Logic at macro 102 is programmed to be aware that a UE showing the characteristics of UE 101 will quickly be handed over to small cell 104. Macro 102 is also aware that small cell 104 is in an overload state, such as by receiving an X2 message from small cell 104, or such as receiving a message from a coordinating gateway of small cell 104 (not shown) regarding the status of small cell 104. Macro 102 thus performs an adjustment to delay or reduce the likelihood of a handover to small cell 103, thus preventing handover to small cells 103 and 104. The adjustment will be described in connection with FIGS. 2 and 3.

Figure 2:
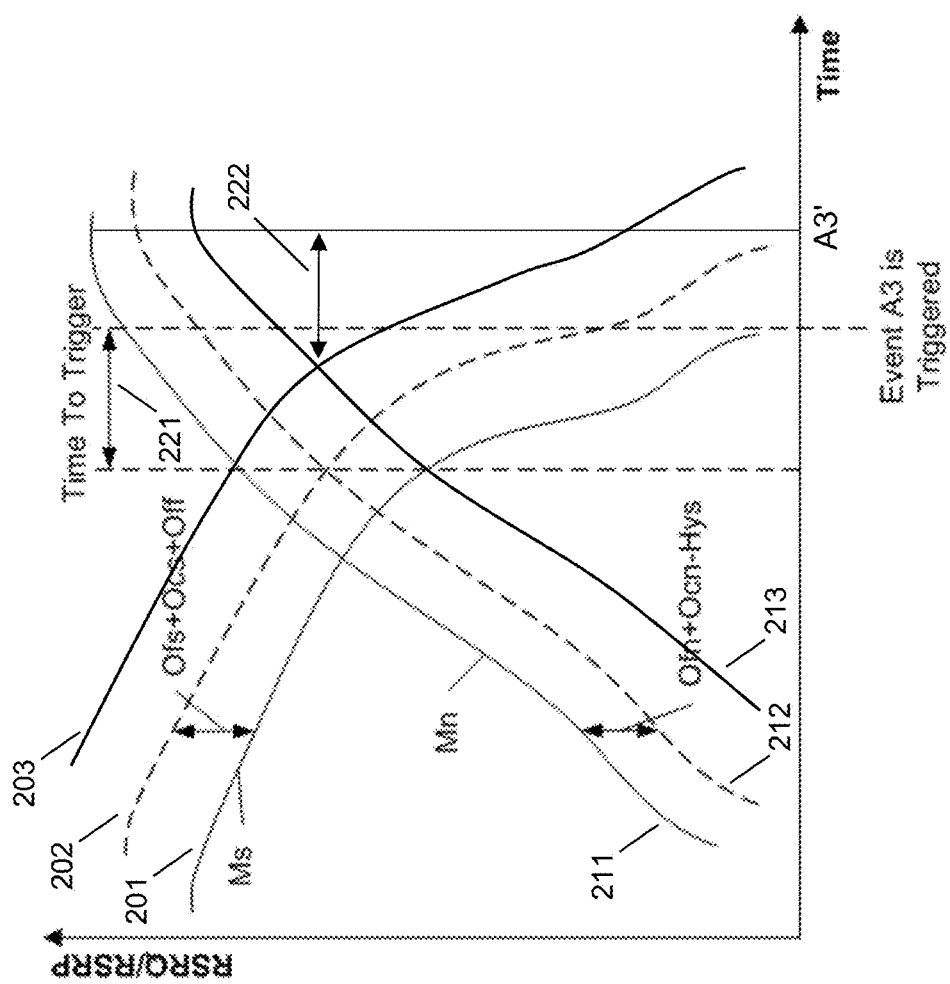
FIG. 2 is a signal quality diagram of a handover scenario from a serving cell to a neighbor cell, in accordance with some embodiments.

FIG. 2 is a signal quality diagram of a handover scenario from a serving cell to a neighbor cell, in accordance with some embodiments. FIG. 2 depicts a modified version of Event A3 (neighbor becomes better than serving cell by an offset) as described in 3GPP TS 36.331, hereby incorporated by reference in its entirety, specifically with reference to Rel. 10, version 19, section 5.5.4.4. The UE uses the two inequalities 3-1 and 3-2 to determine when to send measurement reports, which result in the base station directing handover, as follows.

$$Mn+Ofn+Ocn-Hys>Mp+Ofp+Ocp+Off \text{ Inequality A3-1 (Entering condition):}$$

$$Mn+Ofn+Ocn+Hys<Mp+Ofp+Ocp+Off \text{ Inequality A3-2 (Leaving condition):}$$

where Mn is a signal measurement result of the new neighboring cell, Ofn is a frequency-specific offset for the neighbor cell, Ocn is a cell-specific offset of the neighboring cell, Ofp and Ocp are corresponding frequency-specific and cell-specific offsets for the serving cell (Primary Cell), Hys is a hysteresis value, and Off is an offset value, as described in 3GPP TS 36.331.

When Inequality A3-1 is crossed, the UE enters a temporary state; this state is exited when Inequality A3-2 is crossed or when Inequality A3-1 no longer holds true. In the prior art, this is when the neighbor cell is significantly better by the sum of the three offsets than the primary cell. However, the serving base station is able to send these offsets to an attached UE. The serving base station may thus calculate separate offsets on a per-cell, per-UE basis, and can send these offsets to the UE to dynamically adjust handovers.

A plot is shown of signal quality (labeled RSRQ/RSRP but which could be any equivalent signal quality measure) versus time. Line 201 is the signal measurement of the serving station. Line 211 is the signal of the neighbor node. Signal 202 is the serving cell signal combined with the prior art offset value, and signal 203 is the signal combined with the adjusted offset value, in accordance with some embodiments. Signal 212 is the neighbor signal combined with the prior art offset value, and signal 213 is the signal combined with the adjusted offset value, in accordance with some embodiments. The offsets depicted here have caused a greater time to trigger Event A3 222 to be used rather than the ordinary time to trigger 221, resulting in the base station being more "sticky," and hanging on for longer to an attached UE. As all the offsets can be adjusted by the serving base station in conjunction with one or more coordinating nodes, it is possible that the serving base station can be more or less likely to hand over, and this may also be dependent on each individual UE and target cell.

Figure 3:
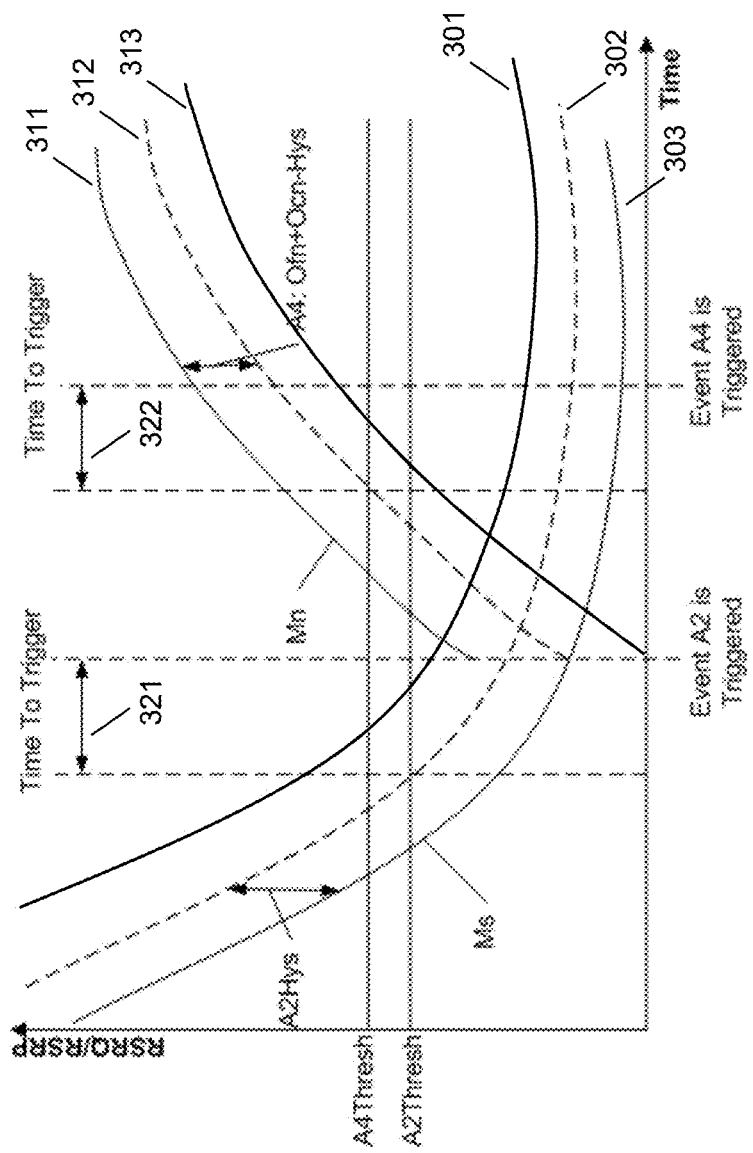
FIG. 3 is a signal quality diagram of a second handover scenario from a serving cell to a neighbor cell, in accordance with some embodiments.

FIG. 3 is a signal quality diagram of a second handover scenario from a serving cell to a neighbor cell, in accordance with some embodiments. Similar to FIG. 2, various measurement reporting thresholds (A2, serving becomes worse than threshold, and A4, neighbor becomes better than threshold) are shown. The equations for A2 and A4 are:

$Ms+Hys<Thresh$    Inequality A2-1 (entering condition):

$Ms-Hys>Thresh$    Inequality A2-2 (leaving condition):

$Mn+Ofn+Ocn-Hys>Thresh$    Inequality A4-1 (entering condition):

$Mn+Ofn+Ocn+Hys<Thresh$    Inequality A4-2 (leaving condition):

Signal 301 is a signal of the serving cell, and signal 302 is a prior art signal plus hysteresis, and signal 303 is an enhanced signal plus hysteresis. Signal 311 is a neighbor signal, and 312 is a prior art signal plus offsets, and 313 is an enhanced signal plus offsets. Time to trigger 321 (event A2) and 322 (event A4) are shown according to the prior art. Although the times to trigger using the enhanced signals are not shown, they would result in the base station becoming more "sticky" here as in FIG. 2 (by retarding the time when the events A2 and A4 are triggered). In some embodiments, one or more of these thresholds and offsets may be configured according to a need to either increase or decrease handover likelihood in a particular case.

Figure 4:
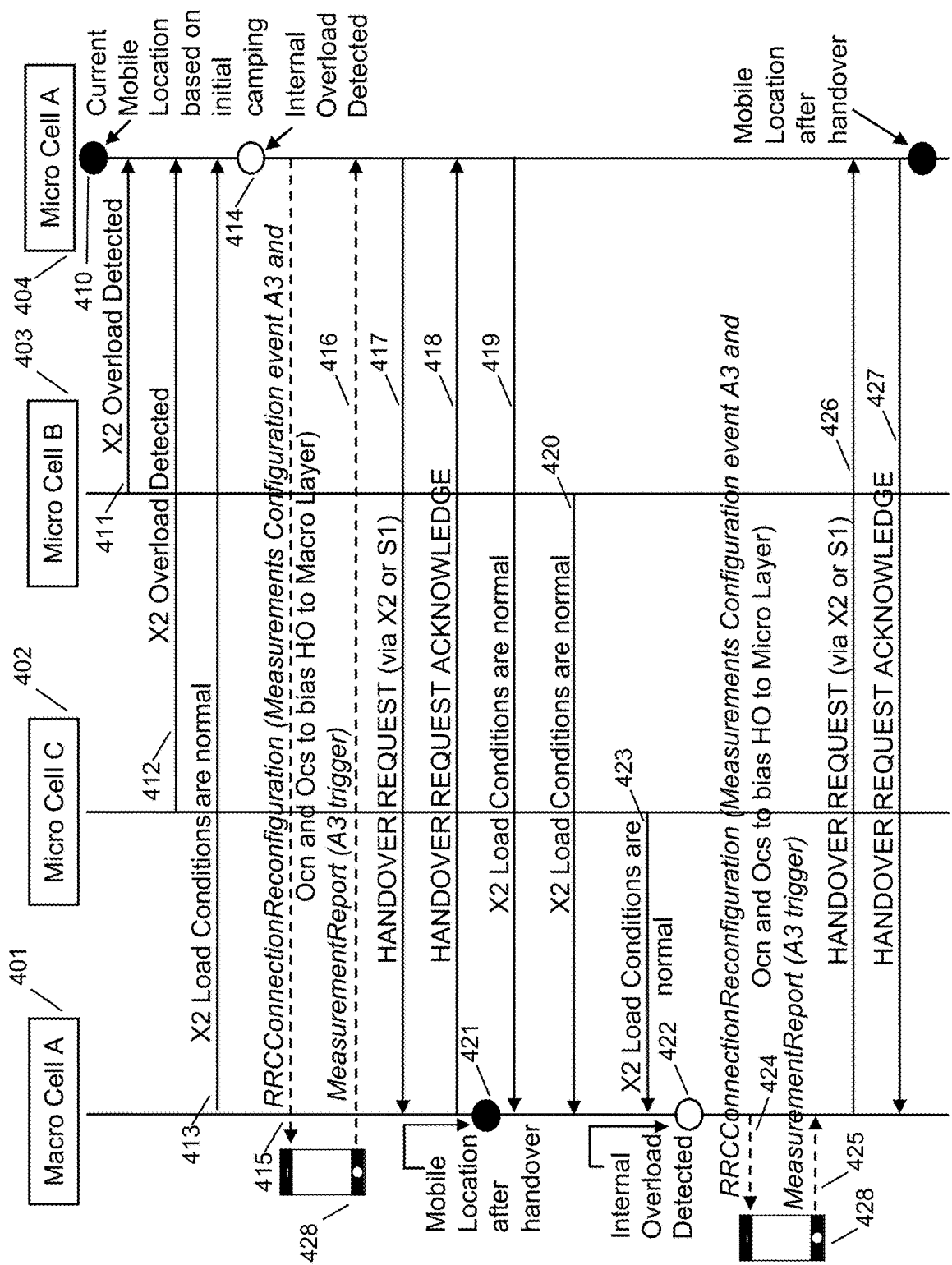
FIG. 4 is a call flow showing a first intra-frequency multi-layer handover procedure, in accordance with some embodiments.

FIG. 4 is a call flow showing a first intra-frequency multi-layer handover procedure, in accordance with some embodiments. Macro cell A 401 is in a network with micro cell C 402, micro cell B 403, and micro cell A 404. A UE 428 is also shown. At step 410, the current location of the UE is known based on initial camping at cell A. At steps 411, 412, and 413, X2 load conditions are reported, showing that load conditions are normal at macro cell A and overload is detected at cells B and C, as well as internal overload being present at cell A in step 414.

At this stage, a desirable handover is determined at micro cell A to constitute a handover to macro 401, based on load, and offsets Ocn and Ocs are calculated accordingly to bias the handover to hand over to the macro. At step 415, an RRCConnectionReconfiguration is performed as a prelude to handover, sending the Ocn and Ocs to the UE, resulting in measurement report 416. At step 417, the handover is requested by cell A, and at step 418, the UE acknowledges the handover, resulting in the UE being located at the macro at step 421.

At a later time, the load conditions may improve at cells A, B, and C. When macro cell A receives normal X2 load condition reports 419, 420, 423, and when macro cell A detects internal overload at step 422, the macro can calculate a new set of offsets and send the offsets to the UE via RRCConnectionReconfiguration message 424, which is acknowledged 425. The macro cell A sends a handover request 426, which may be via X2 or S1, which is acknowledged 427 and the UE is handed over.

Figure 5:
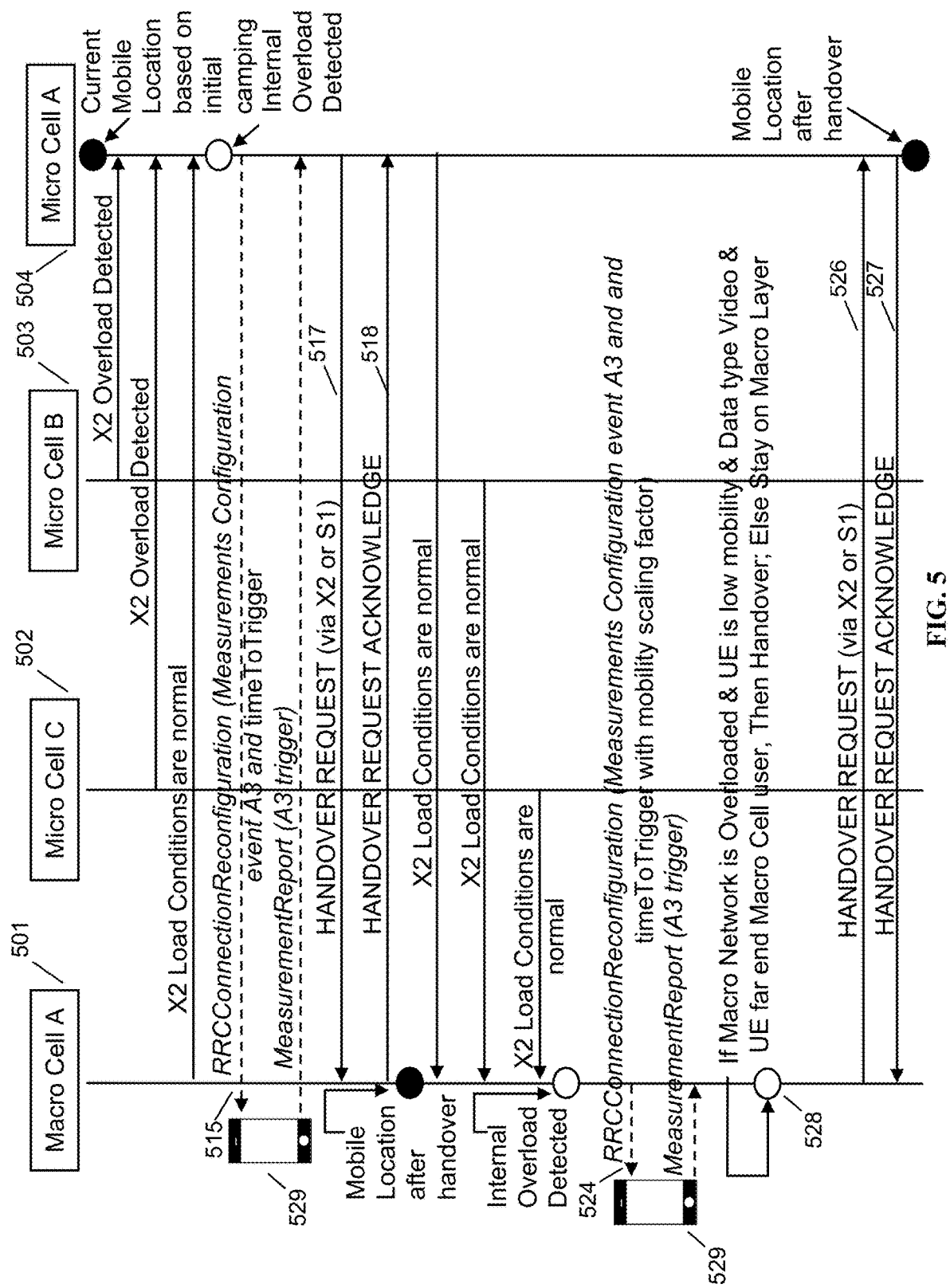
FIG. 5 is a call flow showing a second intra-frequency multi-layer handover procedure, in accordance with some embodiments.

FIG. 5 is a call flow showing a second intra-frequency multi-layer handover procedure, in accordance with some embodiments. Macro cell A 501, micro cells A 504, B 504, and C 502, and UE 529 are shown. In FIG. 5, an overload is detected at micro cells A, B, and C, and a handover is caused from micro cell A to macro cell A as in FIG. 4, but in an alternate embodiment the timeToTrigger parameter in message 515 is changed to bias the handover. A handover is performed 517 and acknowledged 518 as a result to macro cell A.

At a later time, when the micro cells are not overloaded, macro cell 501 sends an RRConnectionReconfiguration message with a biased timeToTrigger value and a mobility scaling factor, resulting in a handover 526 to micro cell A and response 527. The macro cell A is also able to determine, at step 528 before sending the handover request, whether the handover should be requested based on one or more coordination factors. Here, the factors of load, UE mobility (UE speed), data type, UE distance from macro cell are all considered before sending the message to hand over.

Figure 6:
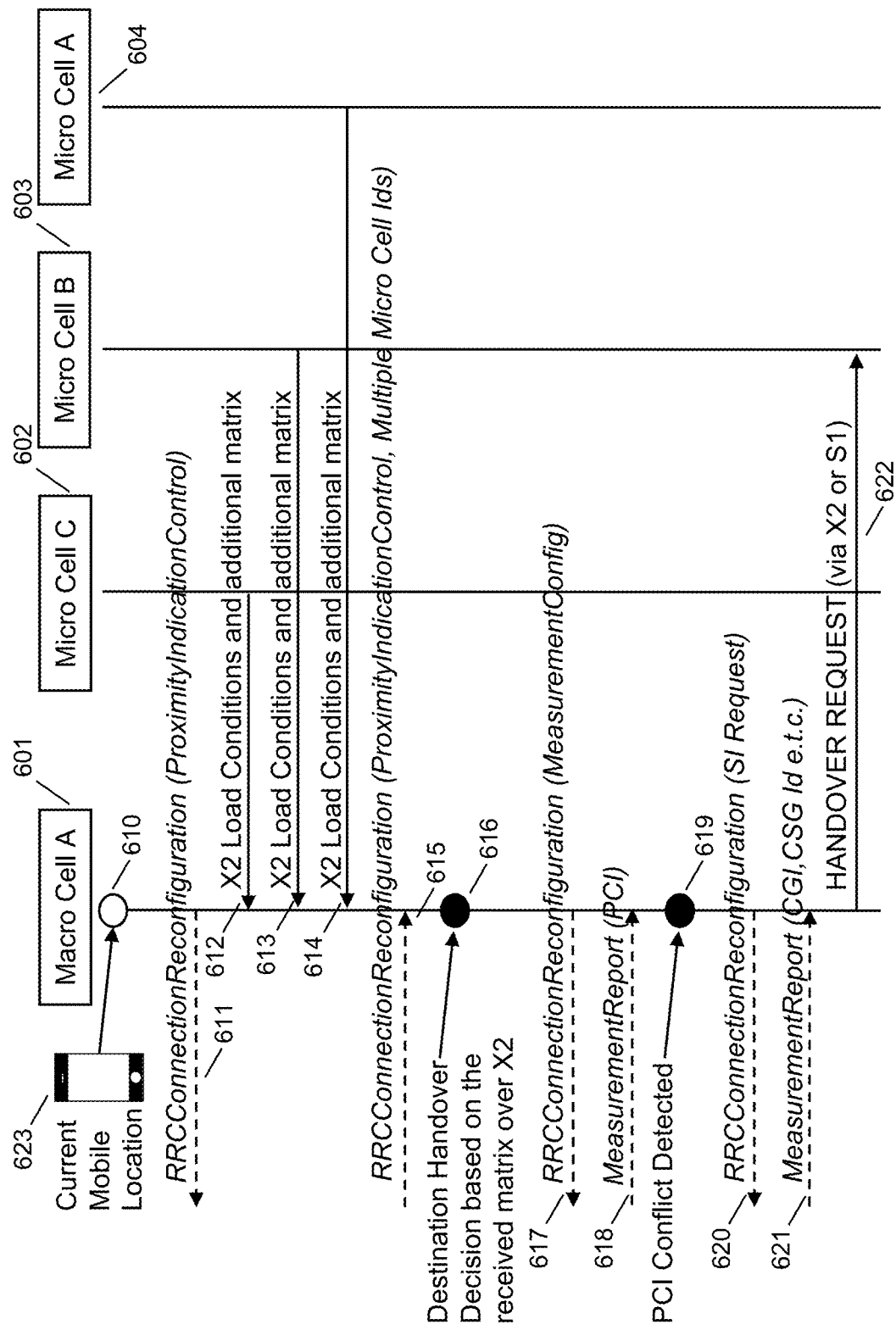
FIG. 6 is a call flow showing a first handover procedure using reported load conditions, in accordance with some embodiments.

FIG. 6 is a call flow showing a first handover procedure using reported load conditions, in accordance with some embodiments. In some cases multiple micro cells may share the same PCI, particularly when they are not visible to each other. Macro cell A 601, micro cell A 604, micro cell B 603, and micro cell C 602 are shown, together with UE 623, which is presently located at (attached to) macro cell A at step 610. The micro eNodeBs could be grouped into the CSG with 27-bit standard identities, in some embodiments. The destination handover decision at mcro cell A is based on the X2 load conditions and additional matrices retrieved from micro cells A, B, and C at 612, 613, 614. The handover decision is performed at step 716. When the UE is queried for a measurement report at step 717, 718, a PCI conflict is detected at step 719 at the macro based on the response from the UE. An additional measurement 620 is requested and at 621 is received, identifying the CGI or other identifier of the target cell, so that the handover 622 can be appropriately directed.

Figure 7:
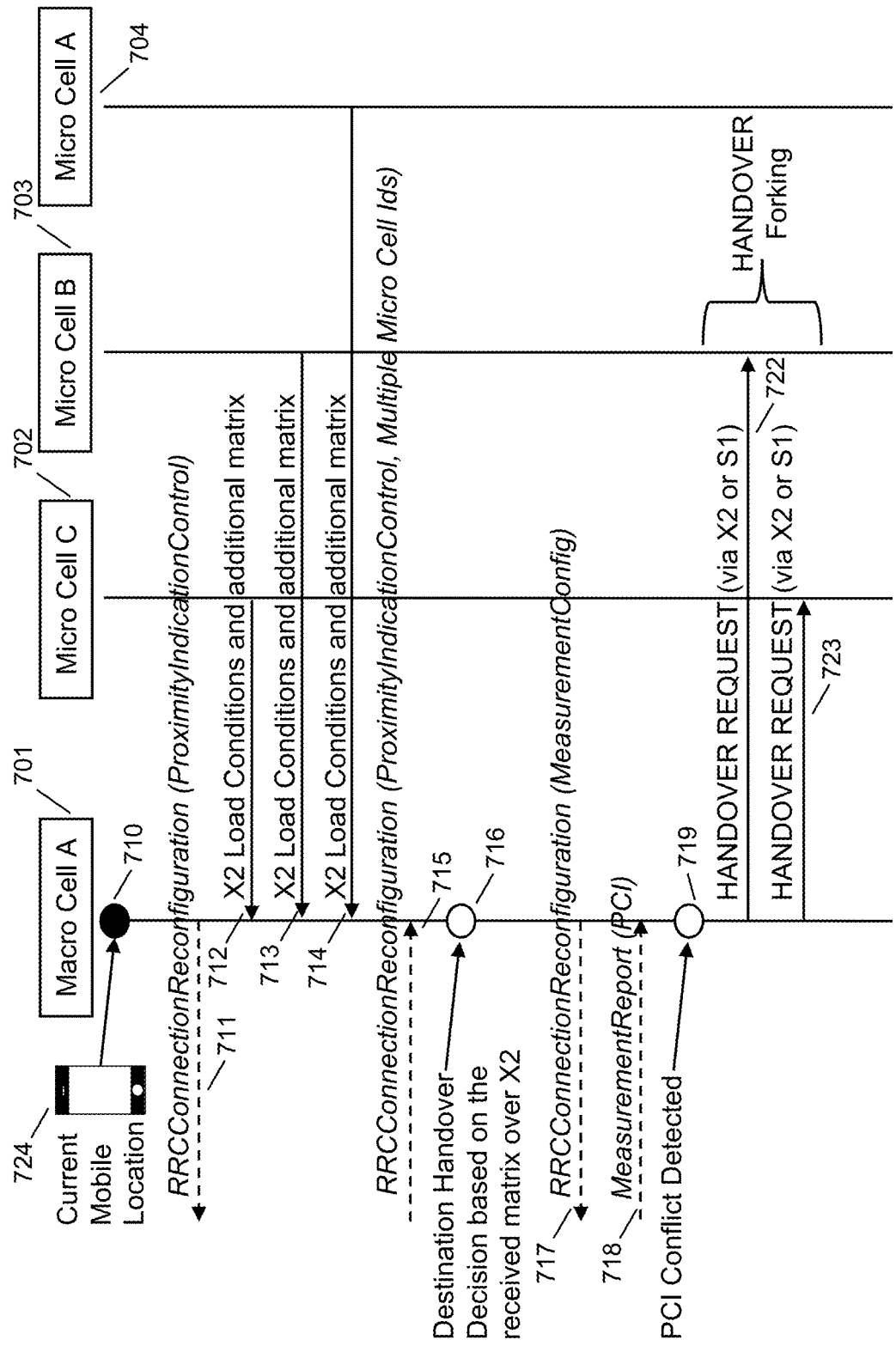
FIG. 7 is a call flow showing a second handover procedure using reported load conditions, in accordance with some embodiments.

FIG. 7 is a call flow showing a second handover procedure using reported load conditions, in accordance with some embodiments. FIG. 7 is similar to FIG. 6 except that instead of causing the UE to obtain an ECGI identifier to uniquely identify the target cell, handover forking is used. This results in a single handover request being sent both to micro cell 802 and 803, which share the same PCI. Only one of the requests is successful.

Figure 8:
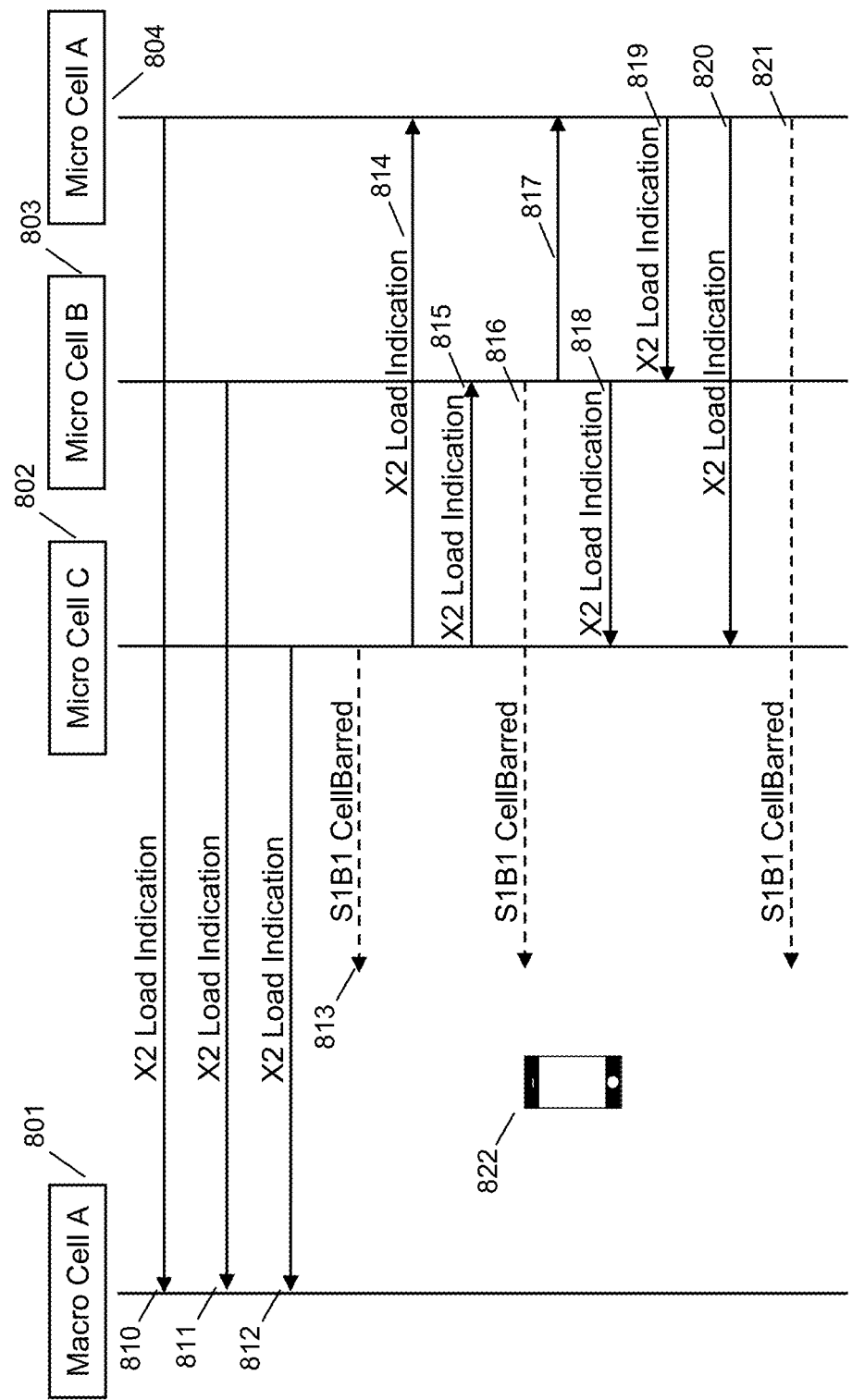
FIG. 8 is a call flow showing a network overload policy being applied to a user equipment, in accordance with some embodiments.

FIG. 8 is a call flow showing a network overload policy being applied to a user equipment in idle mode, in accordance with some embodiments. Load balancing in a network can be enabled by causing a coordinating node, in this instance macro cell A 801, to receive X2 load indications from micro cells 802, 803, 804 and also for a UE to receive Cell Barred messages directly from these macro cells. Once UE in idle mode gets close to Micros and can receive SIB messages it shall be forced to select Micros using measurements (thresholds sent with SIB1) and cell resection using priorities (information provided in SIB3). If Micros become overloaded SIB1 with CellBarred indication shall be sent. Load Balancing can be achieved from dynamic TX power and RET from Macro.

Figure 9:
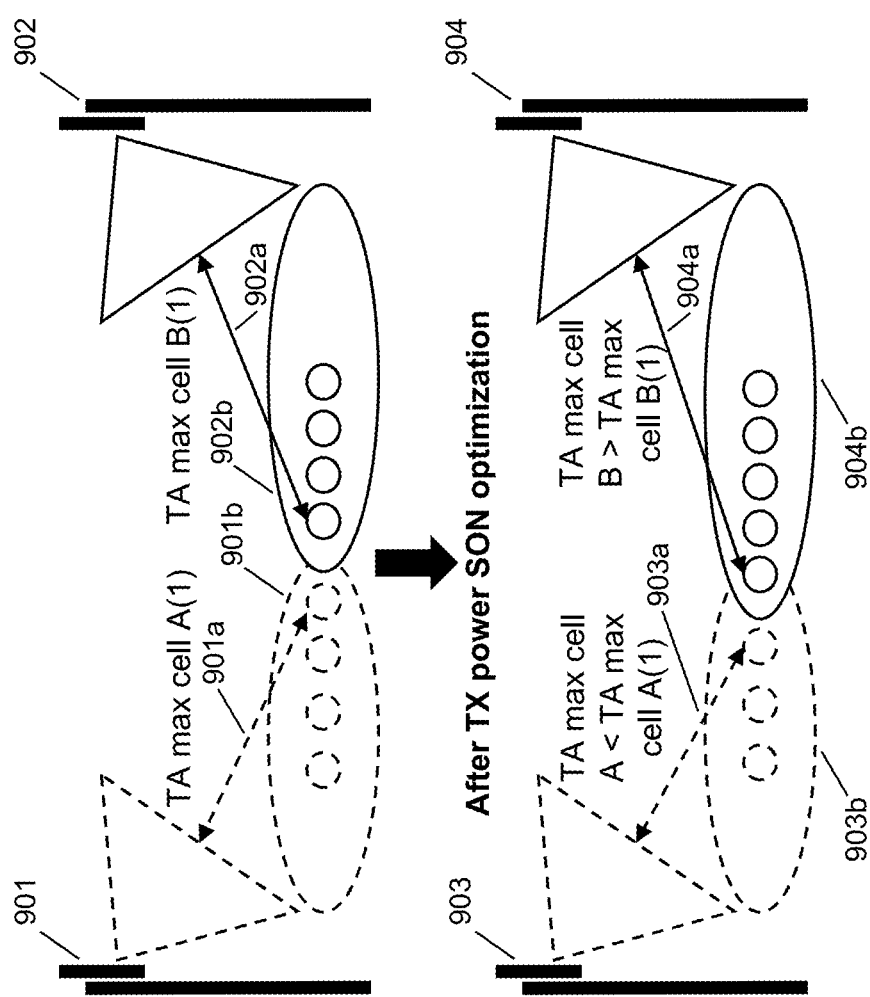
FIG. 9 is a schematic diagram showing distance calculation with power management, in accordance with some embodiments.

FIG. 9 is a schematic diagram showing distance calculation with power management, in accordance with some embodiments. UE location for smart algorithm can be deduced from Timing advance and SRS, in some embodiments. Cells 901, 902 share a coverage region. Cell 901 has a max cell distance 901a and a coverage region 901b. Cell 902 also has a max cell distance 902a and a coverage region 902b. However, these cells overlap in such a way that cell 902 should be configured to cover more of the cell edge. Based on UE measurement reports, and based on tracking signal strength at the UEs at the cell edge, transmit power SON optimization is performed. This results in cell 903 and 904, where cell 903 has a smaller cell area 903b, but stronger signal to all users, including to users in the cell edge, as cell 904 now has increased its coverage area 904b to cover the cell edge. Distance can be based on: average of X numbers of TA values; PHR reports; improved QOS for cell edge users. Additionally, when distance is available, mobile load balancing, congestion control may be performed.

In some embodiments, parameter profiles could be made and applied to certain handsets. For example, Handover Optimized Parameters for Highway sites would be such Handover takes place asap; A3 to be less to triggered quickly; Hysteresis and offset also to support fast Handover; Less number of Min reporting required; Time to trigger to be reduced; and H/W sites to have multiple common PLMNS/TACs.

Figure 10:
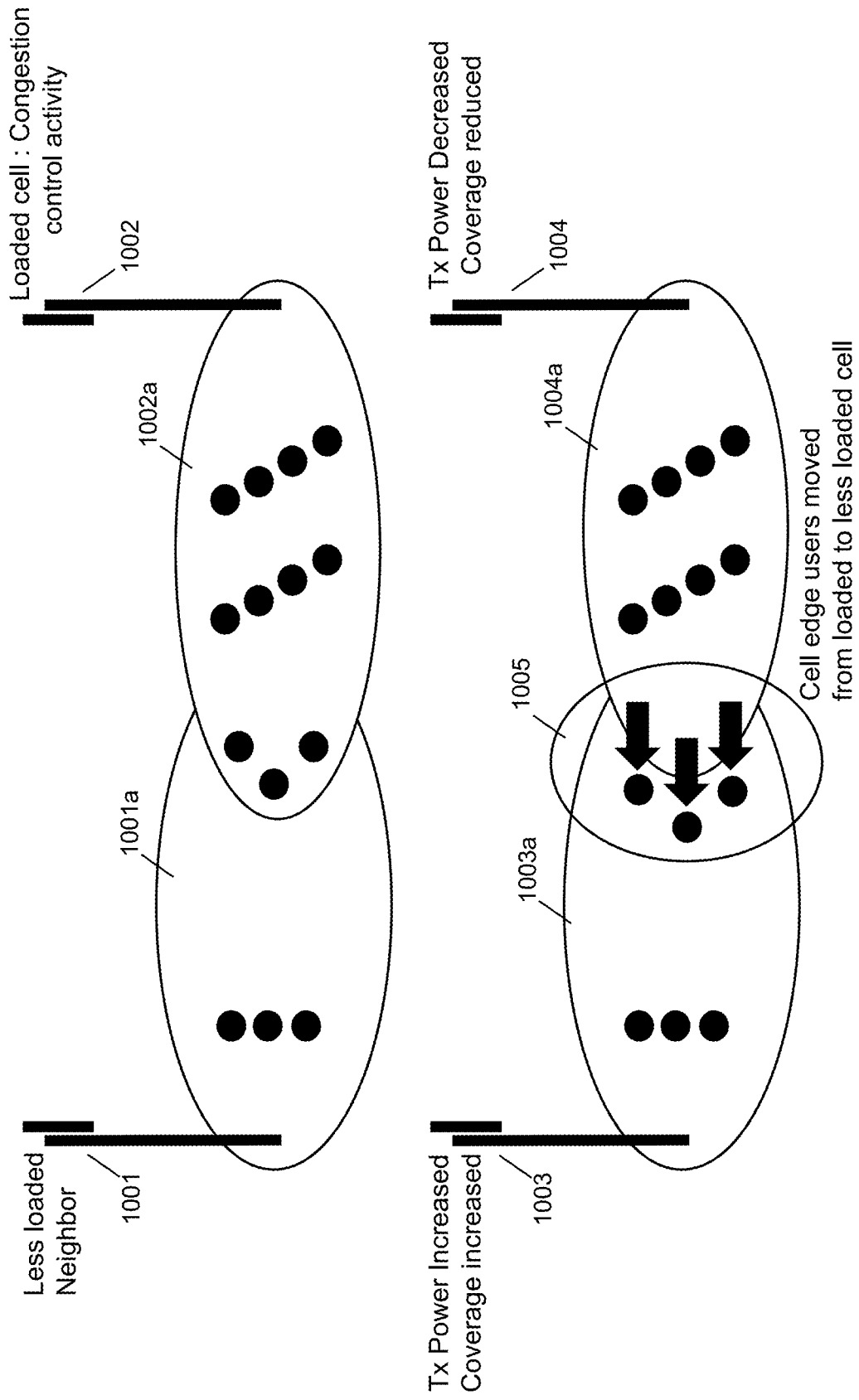
FIG. 10 is a schematic diagram showing load balancing, in accordance with some embodiments.

FIG. 10 is a schematic diagram showing load balancing, in accordance with some embodiments. A less loaded neighbor 1001 and a loaded cell 1002 are shown. When the loaded cell is known to be loaded, it can coordinate using SON to a coordinating node or to each other via X2 to cause the transmit power of cell 1003 to go up and cell 1004 to go down, causing cell edge users to be moved from the loaded to less loaded cell.

Figure 11:
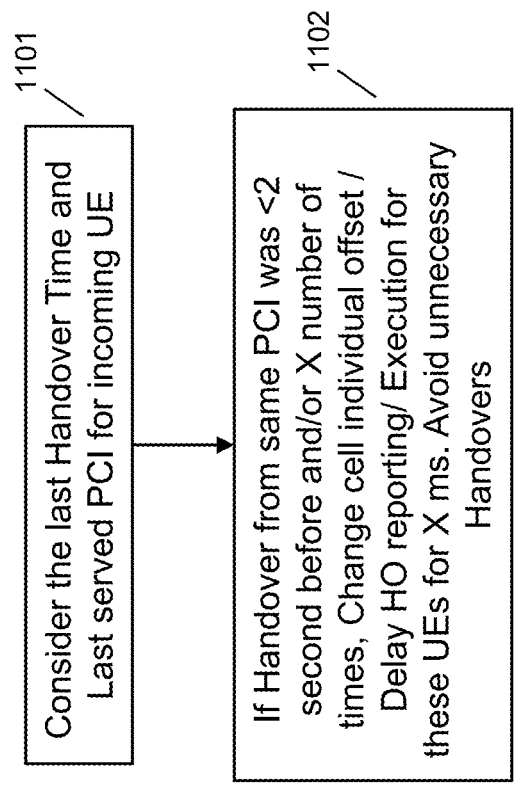
FIG. 11 is a flowchart showing dynamic handover adjustment, in accordance with some embodiments.

FIG. 11 is a flowchart showing dynamic handover adjustment, in accordance with some embodiments. At step 1101, the coordinating node, which may be a separate gateway RAN node or may be the macro cell, may consider the last handover time and last served PCI for a UE. This may be at attach time for the UE, or at a subsequent time such as prior to a handover request. At step 1102, various parameters may be checked to determine whether handover is appropriate. For example, as shown here, if the handover of that UE (or in some embodiments another UE or all UEs) from the same PCI was within a short time before, here shown as 2 seconds, and/or if a large number of handovers has been performed from that cell for the same UE, then the cell individual offset, delay handover reporting parameters, etc. may be changed for this UE to avoid unnecessary handovers. This change can take effect immediately and may last for a period of time, such as X milliseconds as shown.

Figure 12:
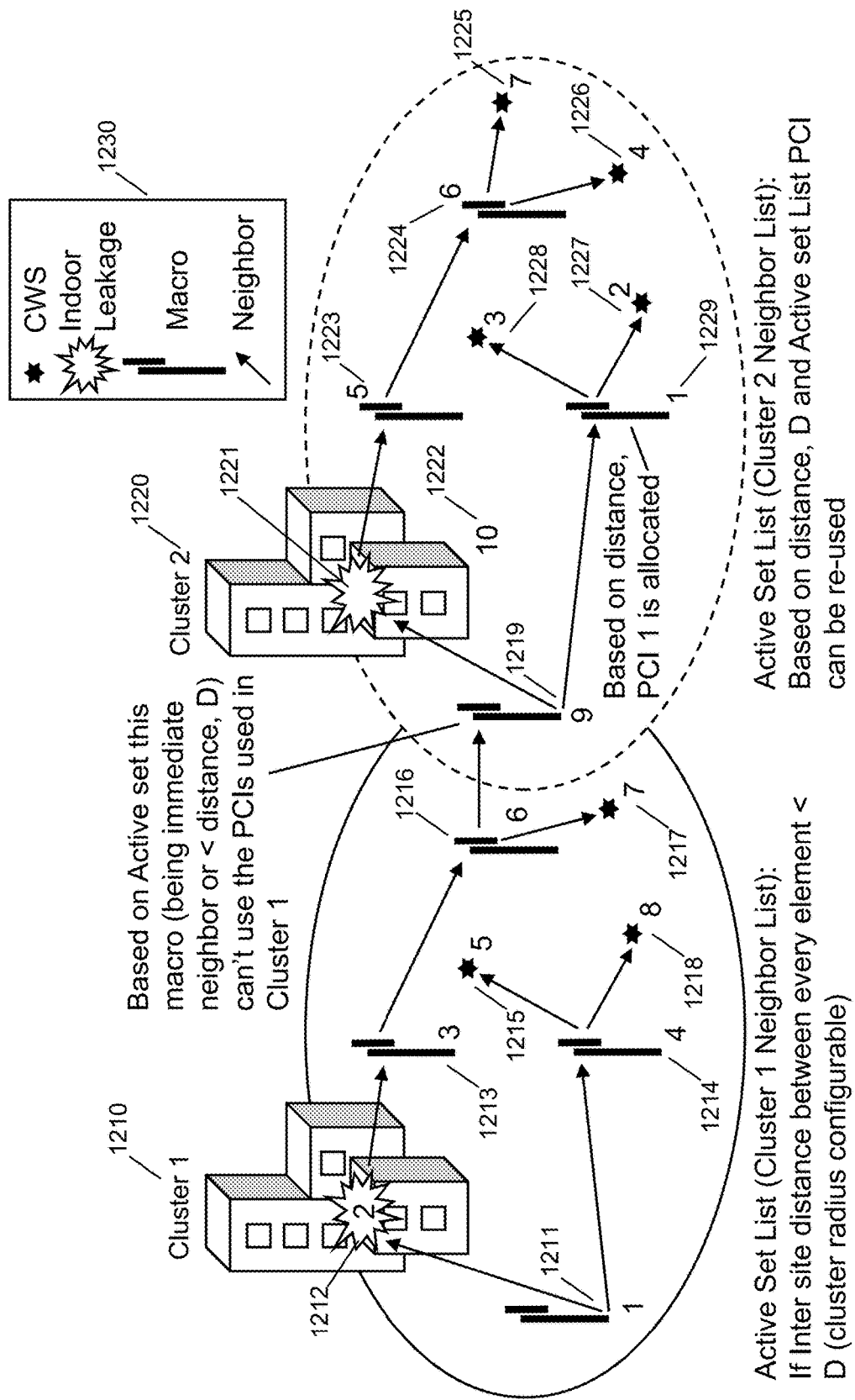
FIG. 12 is a schematic diagram showing PCI allocation, in accordance with some embodiments.

FIG. 12 is a schematic diagram showing PCI allocation, in accordance with some embodiments. Cluster 1 1210, comprising macro cells 1211, 1212, 1213, 1214, 1216, 1217 and small cell base stations 1215, 1218, is shown. Cluster 1 has indoor leakage at location 1212, from an indoor access point or enterprise access point. Cluster 2 1220 is also shown, comprising indoor base station 1221, macro cells 1223, 1224, 1229, and small cell base stations 1225, 1226, 1227, 1228. Macro 1219 is in the cell edge between both base stations. Based on the active set list (cluster 1 neighbor list), macro 1229 is assigned the PCI value of 1 from a pool of values, since the other base station with PCI 1 is base station 1211, which is far away. In some embodiments the radius can be configurable. In some embodiments assignment may happen automatically; in other embodiments it may occur with preplanning.

Figure 13:
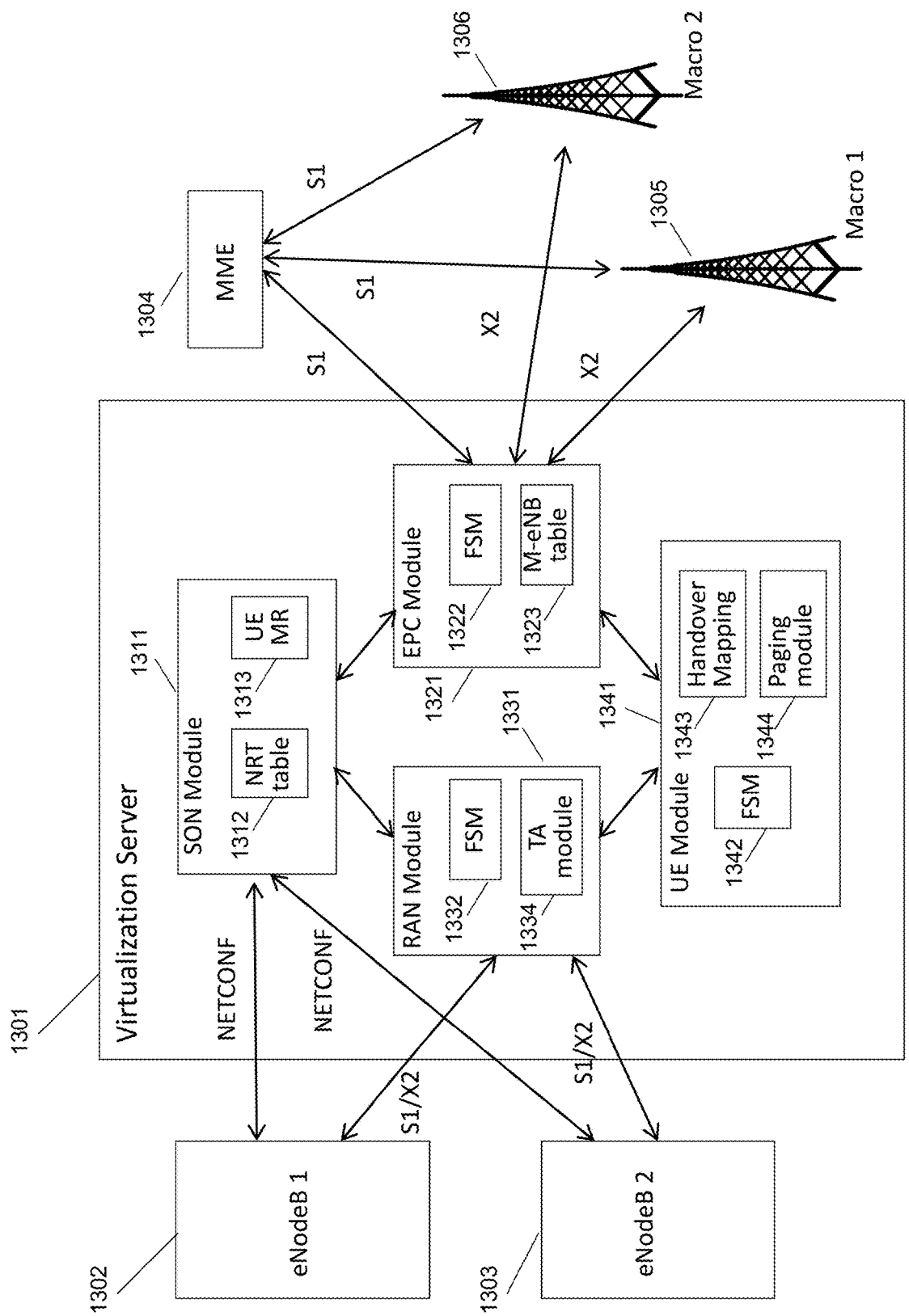
FIG. 13 is a schematic diagram of a virtualization server in a Long Term Evolution (LTE) architecture, in accordance with some embodiments.

FIG. 13 is a schematic diagram of a virtualization server in a Long Term Evolution (LTE) architecture, in accordance with some embodiments. Virtualization server 1301 provides services to, and is coupled to, eNodeB 1 1302 and eNodeB 5 1303, on a RAN side of a network (i.e., inside of the gateway). Virtualization server 1301 provides services to, and is coupled to, MME 1304, macro eNodeB 1305, and macro eNodeB 1306, on a core network side of the network (outside of the gateway).

Within virtualization server 1301 are self-organizing network (SON) module 1311, containing neighbor relation table (NRT) 1312 and UE measurement report processing module 1313; evolved packet core (EPC) module 1321, containing EPC finite state machine module 1322 and macro eNodeB table 1323; radio access network (RAN) module 1331, containing eNodeB finite state machine module 1332 and tracking area module 1334; and user equipment (UE) module 1341, containing UE finite state machine module 1342, S1/X2 handover mapping table 1343, and paging module 1344. Each of modules 1311, 1321, 1331, and 1341 are coupled to each other within virtualization server 1301, and may execute on one or more shared processors (not shown) coupled with memory (not shown).

In some embodiments, SON module 1311 may perform NRT maintenance, load information processing and fractional frequency reuse (FFR) processing; RAN module 1331 may perform X2 association management with eNodeBs 1302, 1303; EPC module 1321 may perform X2 association management with macro eNodeBs 1305, 1306; and UE module may perform X2 handover and S1/X2 translation between eNodeBs 1302, 1303 and macro eNodeBs 1305, 1306. All the above managers/modules interact with each other to accomplish the assigned functionality.

In any given call flow or message exchange, each module 1322, 1332, 1342 may independently track the state of the core network/macro eNodeB, the internal eNodeB, and the UE, in some embodiments, such that the state of each of the components is fully known by one of the modules.

In some embodiments, EPC module 1321 may contain EPC finite state machine module 1322 and macro eNodeB table 1323. EPC finite state machine module 1322 may track the state of any messages or call flows being sent or received with a macro eNodeB, such as macro eNodeBs 1305, 1306. EPC FSM module 1322 may, for example, determine whether a handover has been initiated by macro eNodeB 1305, 1306, as well as other functions. EPC FSM module 1322 may also track which eNodeBs within the network are involved in communicating with the macro eNodeBs, and may perform network address translation by mapping incoming requests and messages from an eNodeB address external to the gateway 1301 to an address internal to the gateway 1301, using eNodeB table 1323. In some embodiments the tracking and network address translation functions may be performed at the RAN module or in another module. Macro eNodeB table 1323 may track all macro eNodeBs and any connections, bearers, tunnels, or calls open between an eNodeB internal to the gateway, such as eNodeBs 1302 and 1303.

In some embodiments, RAN module 1331 may contain RAN finite state machine module 1332 and eNodeB table 1334. RAN module 1331 is the counterpart to EPC module 1321 on the side of the network inside the gateway. RAN FSM module 1332 may track and receive messages and requests, and may track the state of the RAN node in any message exchange. An eNodeB table may include a mapping to from an eNodeB ID or cell ID to the ECGI ID used outside of the private network. In some embodiments, RAN module 1331 may perform network address translation, if applicable, on messages received by RAN module from eNodeBs 1302, 1303, so that the messages can be sent upstream to the EPC and/or core network. In some embodiments, network address translation is used at both RAN module 1331 and EPC module 1321, for connections initiated at the RAN and at the EPC, respectively.

The tracking area module 1334 maintains a list of all eNodeBs that are in each particular tracking area. For some virtualization servers, a single tracking area may include all eNodeBs coupled to server 1301. For others, multiple tracking areas may be tracked, with some subset of the eNodeBs served by virtualization server 1301 being part of each of the multiple tracking areas. When a paging request is sent for a UE, in some cases the list of base stations that are part of the single tracking area may be considered as part of the information used for identifying a set of base stations to perform paging.

As RAN module 1331 is in the data path for all S1 communications to the core network, including communications to MME 1304, RAN module 1331 may perform proxying and network address translation for the S1 connection, in addition to supporting the X2 connection, in some embodiments. RAN module 1331 may also pass along any UE measurement reports received from UEs to either or both of UE module 1341 and SON module 1311.

In some embodiments, UE module 1341 may contain UE finite state machine module 1342 and handover mapping table 1343. UE finite state machine module 1342 may track states for call flows that are in process between a UE connected to one or more eNodeBs and either a core network node or a target eNodeB. For example, UE FSFM 1342 may track when an X2 handover request message has not been responded to and should expire. UE FSFM 1342 may also track X2/S1 handovers, in conjunction with handover mapping table 1343. When an X2 handover request is received, UE FSFM 1342 may, in some embodiments, determine whether a handover should be translated from S1 to X2, or vice versa, before the handover should continue. UE module 1341 handles UE-related requests from both the RAN module 1331 (from nodes internal to gateway 1301) and from EPC module 1321 (from nodes external to gateway 1301).

Paging module 1344 records information about each UE that comes in contact with virtualization server 1301, through eNodeBs 1302, 1303, or other eNodeBs or base stations. Information such as physical location, historical location, handovers and handover preferences, as described elsewhere herein, is collected in the paging module. When a downlink data notification is received at the virtualization server, the EPC module 1321 requests that the paging module 1344 assist in locating the UE. Paging module 1344, in some embodiments, may come up with a precise eNodeB, or may come up with a set of eNodeBs or multiple sets of eNodeBs to be paged to locate the UE, based on the stored location information. This list of eNodeBs is then sent to the RAN module 1331 to initiate paging requests thereto.

Figure 14:
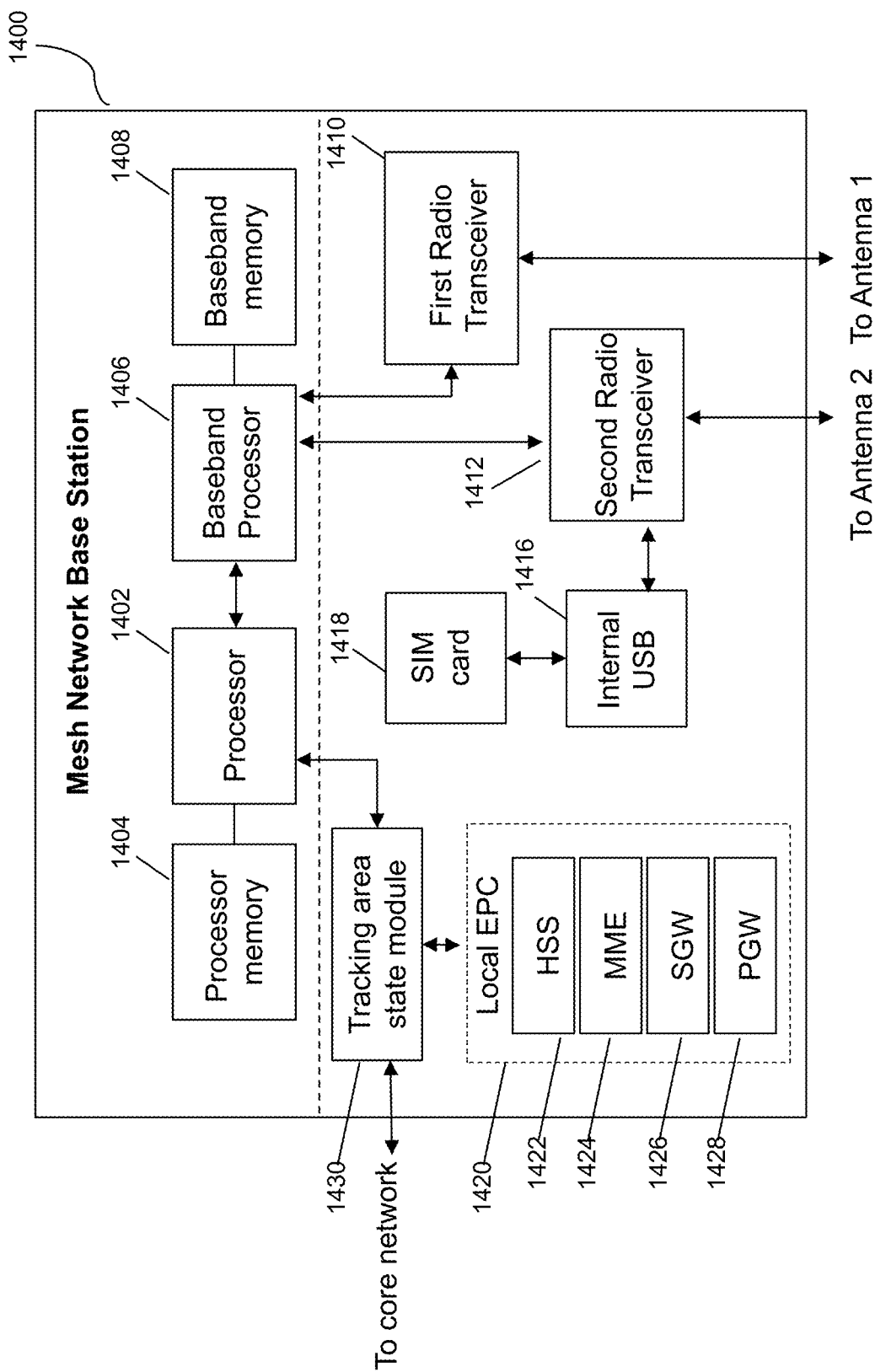
FIG. 14 is a schematic diagram of a mesh network base station, in accordance with some embodiments.

FIG. 14 is a schematic diagram of a mesh network base station, in accordance with some embodiments. Mesh network base station 1400 may include processor 1402, processor memory 1404 in communication with the processor, baseband processor 1406, and baseband processor memory 1408 in communication with the baseband processor. Base station 1400 may also include first radio transceiver 1410 and second radio transceiver 1412, internal universal serial bus (USB) port 1416, and subscriber information module card (SIM card) 1418 coupled to USB port 1414. In some embodiments, the second radio transceiver 1412 itself may be coupled to USB port 1416, and communications from the baseband processor may be passed through USB port 1416.

A tracking area state module 1430 may maintain the tracking area code for base station 1400, as well as the PLMN for the base station's network, enabling the base station to report its tracking area code and tracking area identity. Tracking area state module may also pass through requests from a core network module to send a new tracking area list to a UE. Tracking area state module may be in communication with a core network, as shown. Additionally, local EPC 1420 may be used for authenticating users and performing other core network-dependent functions when no backhaul link is available. Local EPC 1420 may include local HSS 1422, local MME 1424, local SGW 1426, and local PGW 1428, as well as other modules. Local EPC 1420 may incorporate these modules as software modules, processes, or containers. Local EPC 1420 may alternatively incorporate these modules as a small number of monolithic software processes. Virtualization layer 1430 and local EPC 1420 may each run on processor 1402 or on another processor, or may be located within another device.

Processor 1402 and baseband processor 1406 are in communication with one another. Processor 1402 may perform routing functions, and may determine if/when a switch in network configuration is needed. Baseband processor 1406 may generate and receive radio signals for both radio transceivers 1410 and 1412, based on instructions from processor 1402. In some embodiments, processors 1402 and 1406 may be on the same physical logic board. In other embodiments, they may be on separate logic boards.

The first radio transceiver 1410 may be a radio transceiver capable of providing LTE eNodeB functionality, and may be capable of higher power and multi-channel OFDMA. The second radio transceiver 1412 may be a radio transceiver capable of providing LTE UE functionality. Both transceivers 1410 and 1412 are capable of receiving and transmitting on one or more LTE bands. In some embodiments, either or both of transceivers 1410 and 1412 may be capable of providing both LTE eNodeB and LTE UE functionality. Transceiver 1410 may be coupled to processor 1402 via a Peripheral Component Interconnect-Express (PCI-E) bus, and/or via a daughtercard. As transceiver 1412 is for providing LTE UE functionality, in effect emulating a user equipment, it may be connected via the same or different PCI-E bus, or by a USB bus, and may also be coupled to SIM card 1418.

SIM card 1418 may provide information required for authenticating the simulated UE to the evolved packet core (EPC). When no access to an operator EPC is available, local EPC 1420 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1400 is not an ordinary UE but instead is a special UE for providing backhaul to device 1400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1410 and 1412, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 1402 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 1402 may identify the appropriate network configuration, and may perform routing of packets from one network interface to another accordingly. Processor 1402 may use memory 1404, in particular to store a routing table to be used for routing packets. Baseband processor 1406 may perform operations to generate the radio frequency signals for transmission or retransmission by both transceivers 1410 and 1412. Baseband processor 1406 may also perform operations to decode signals received by transceivers 1410 and 1412. Baseband processor 1406 may use memory 1408 to perform these tasks.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. In some embodiments, the base stations may be multi-RAT base stations and may support any combination of the RATs described herein. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the base stations that are described herein may be mobile base stations, configured to transmit while stationary, while in motion, or in some configurable combination thereof. Advantages would be understood by one having skill in the art for using features of the present invention with a mobile or moving cell. For example, a coordinating node performing dynamic PCI allocation to a moving cell reduces the chance of PCI confusion observed by a UE. Additionally, since there are moving cells, a macro base station can advantageously resolve the ECGI of the neighbor cell by getting information from a UE, as described herein, and not depending on the internal mapping of PCI-ECGI that is typically used for static layout. A moving base station is described at least at U.S. Pat. No. 8,867,418, "Methods of Incorporating an Ad Hoc Cellular Network Into a Fixed Cellular Network," filed Feb. 18, 2014, which is incorporated by reference earlier in this document.

In some embodiments, anywhere that hand-in is described in this document, one of ordinary skill in the art would understand that a hand-out would also be able to be performed using appropriate modifications well-understood in the art. For example, an X2 connection towards the coordinating node (where the coordinating node is a node as described herein, and may be a Parallel Wireless LTE Access Controller [™], or Parallel Wireless HetNet Gateway [™]) can be available for handover, including handin and handout. The coordinating node routes the incoming handover to the correct moving cell, and may perform X2-S1 handover conversion if required.

In some embodiments, for handouts from the area of control of the coordinating node to a base station not under coordination, the coordinating node may: enable measurement reporting by the EU; resolve ECGI (cell identity) of neighbors by asking the UE and update the ANR table using this information, as described elsewhere herein; build/update a single X2 connection towards the macro on behalf of a set of moving cells by virtualizing them; perform handover decision making based on various criteria; and perform handover conversion as required between S1 and X2, as described at least within U.S. patent application Ser. No. 14/642,544, "Federated X2 Gateway," filed Mar. 9, 2015, previously incorporated by reference.

In some embodiments, PCI allocation and automatic neighbor relations (ANR) buildup for moving cells is described. A unique PCI can be allocated every time a cell stops moving and wants to broadcast. The coordinating node builds up knowledge (for example, a mapping and list) over time of the complete area, using the methods described herein, e.g., network scan results provided by the cell; GPS/location tagging; X2 based exchanges with peer macros; and UE based measurement reporting of neighbors. This enables PCIs to be allocated while avoiding PCI conflicts and confusion.

In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to Wi-Fi networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Accordingly, the disclosure of the present invention is intended to be illustrative of, but not limiting of, the scope of the invention, which is specified in the following claims.

The invention claimed is:

1. A method for performing handover coordination between base stations, comprising:
receiving, at a base station, a first serving cell signal measurement and a first neighbor cell signal measurement from a particular user equipment (UE);
sending an adjustment message, from the base station to the UE, containing a cell-specific offset of the serving cell and a cell-specific offset of the neighbor cell in a reporting threshold based on at least one handover adjustment factor received from a coordinating node;
receiving, at the base station and subsequent to adjusting the cell-specific offsets, a second serving cell signal measurement and a second neighbor cell signal measurement;
deciding whether to trigger a handover event based on the first and the second serving cell signal measurement and the first and the second neighbor cell signal measurement and the cell-specific offsets;
enabling, at a coordinating node, receipt of measurement reports from the UE;
resolving, at the coordinating node, an E-UTRAN cell global identifier (ECGI) of the neighbor cell based on information received from the UE; and
updating, at the coordinating node, an automatic neighbor relations (ANR) table based on the information received from the UE,
thereby enabling handout of the UE from the base station managed by the coordinating node to the neighbor cell not managed by the coordinating node.

2. The method of claim 1, further comprising receiving the second serving cell signal measurement and the second neighbor cell signal measurement from the particular user equipment, and, handing over the particular user equipment to a neighboring base station.

3. The method of claim 1, wherein the base station is an in-vehicle base station, and the in-vehicle base station is configured to allow user equipments to connect to the in-vehicle base station while the in-vehicle base station is stationary, in motion, or as configured by an operator.

4. The method of claim 1, further comprising allocating, at a coordinating node, a unique PCI to the in-vehicle base station when the in-vehicle base station is stopped, and associating the unique PCI with a GPS location.

5. The method of claim 1, further comprising requesting, from the base station to the UE, ECGI of the neighbor cell, and resolving, at the base station, ECGI of the neighbor cell based on the received ECGI information from the UE.

6. The method of claim 1, further comprising translating, at the coordinating node, a first handover message from a first protocol to a second protocol and a second handover message from the second protocol to the first protocol.

7. The method of claim 1, wherein the handover adjustment factor is calculated based on a prior user equipment handover.

8. The method of claim 1, wherein the coordinating node is a gateway situated between the small cell and a cellular operator core network node.

9. The method of claim 1, wherein the base station is a macro cell, and wherein the cell-specific offsets are adjusted to decrease handovers away from the macro cell, thereby causing user equipments to tend to remain attached to the macro cell instead of being handed over to a small cell and being handed back to the macro cell.

10. The method of claim 1, wherein the base station is a macro cell, and wherein the cell-specific offsets are adjusted to increase handovers away from the macro cell and toward the small cell.

11. The method of claim 1, wherein the base station is a small cell, and wherein the cell-specific offsets are adjusted to decrease handovers away from the small cell and toward the macro cell.

12. The method of claim 1, wherein the base station is a small cell, and wherein the cell-specific offsets are adjusted to increase handovers away from the small cell and toward the macro cell.

13. The method of claim 1, further comprising adjusting the cell-specific offset of the serving cell and the cell-specific offset of the neighbor cell subsequent to a prior handover and based on the at least one handover adjustment factor.

14. The method of claim 1, the handover adjustment factors further comprising inter-layer adjustment factors.

15. The method of claim 1, the handover adjustment factors further comprising inter-radio access technology (inter-RAT) handover adjustment factors, for handing over from LTE to 3G or to another RAT.

16. The method of claim 1, further comprising reporting of load and topology to the coordinating node.

17. The method of claim 1, further comprising reporting of load and topology within a cluster of small cells to each small cell in the cluster, and from at least one cell in the cluster to the coordinating node.

18. The method of claim 1, further comprising using an X2 overload indicator to communicate load.

19. The method of claim 1, further comprising performing coordination between macro and small cells for sharing topology information and load distribution information between the macro and small cells.

20. The method of claim 1, further comprising centralizing radio resource management (RRM) functionality at a macro cell layer to coordinate inter-layer mobility and determine a target cell for handover using UE measurement reports.

* * * * *